(12) United States Patent
Dorsett et al.

(10) Patent No.: US 9,764,634 B2
(45) Date of Patent: Sep. 19, 2017

(54) MINING MACHINE AND ENERGY STORAGE SYSTEM FOR SAME

(71) Applicant: Joy Global Longview Operations LLC, Longview, TX (US)

(72) Inventors: William A. Dorsett, Longview, TX (US); James B. Dillinger, Longview, TX (US); Michael John Lyten, Wavell Heights (AU); Marcus N. Barr, Longview, TX (US); Bradley Maxwell Neilson, Mt Keira (AU); Don F. Owings, Longview, TX (US)

(73) Assignee: Joy Global Longview Operations LLC, Longview, TX (US)

( * ) Notice: Subject to any disclaimer, the term of this patent is extended or adjusted under 35 U.S.C. 154(b) by 0 days.

(21) Appl. No.: 15/166,976

(22) Filed: May 27, 2016

(65) Prior Publication Data

US 2016/0347167 A1    Dec. 1, 2016

Related U.S. Application Data

(60) Provisional application No. 62/167,814, filed on May 28, 2015, provisional application No. 62/167,808, filed on May 28, 2015.

(51) Int. Cl.
*B60K 7/00* (2006.01)
*B60T 1/02* (2006.01)
(Continued)

(52) U.S. Cl.
CPC .............. *B60K 7/0007* (2013.01); *B60K 6/30* (2013.01); *B60T 1/02* (2013.01); *B60T 1/10* (2013.01);
(Continued)

(58) Field of Classification Search
CPC .. B60K 7/0007; B60K 7/0038; B60K 7/0053; B60K 7/0061
See application file for complete search history.

(56) References Cited

U.S. PATENT DOCUMENTS

| | | | |
|---|---|---|---|
| 3,623,771 | A | 11/1971 | Sosnowicz et al. |
| 3,915,325 | A | 10/1975 | Lark et al. |

(Continued)

FOREIGN PATENT DOCUMENTS

| | | |
|---|---|---|
| CN | 102071718 | 5/2011 |
| CN | 102848895 | 1/2013 |

(Continued)

OTHER PUBLICATIONS

PCT/US2016/034795 International Search Report and Written Opinion of the International Searching Authority dated Sep. 8, 2016 (12 pages).

(Continued)

*Primary Examiner* — Erez Gurari
(74) *Attorney, Agent, or Firm* — Michael Best & Friedrich LLP

(57) ABSTRACT

A mobile mining machine includes a plurality of traction elements, a plurality of motors, a power source in electrical communication with the plurality of motors, and an energy storage system in electrical communication with the plurality of motors and the power source. Each of the motors is coupled to an associated one of the plurality of traction elements. Each of the motors is driven by the associated traction element in a first mode, and drives the associated traction element in a second mode. The energy storage system includes a shaft, a rotor secured to the shaft, a stator extending around the rotor, and a flywheel coupled to the shaft for rotation therewith. In the first mode, rotation of the motors causes rotation of the flywheel to store kinetic (Continued)

energy. In the second mode, rotation of the rotor and the flywheel discharges kinetic energy to drive the motors.

22 Claims, 19 Drawing Sheets

(51) Int. Cl.
| | |
|---|---|
| E02F 9/20 | (2006.01) |
| B60K 6/30 | (2007.10) |
| E21C 33/02 | (2006.01) |
| H02K 7/02 | (2006.01) |
| B60T 1/10 | (2006.01) |
| B60T 13/58 | (2006.01) |
| F16D 61/00 | (2006.01) |
| E02F 9/22 | (2006.01) |
| B60K 6/46 | (2007.10) |
| E02F 3/34 | (2006.01) |
| E02F 3/43 | (2006.01) |

(52) U.S. Cl.
CPC .......... *B60T 13/586* (2013.01); *E02F 9/2041* (2013.01); *E02F 9/2075* (2013.01); *E02F 9/2091* (2013.01); *E21C 33/02* (2013.01); *F16D 61/00* (2013.01); *H02K 7/025* (2013.01); *B60K 6/46* (2013.01); *B60T 2270/60* (2013.01); *B60Y 2200/415* (2013.01); *B60Y 2200/92* (2013.01); *E02F 3/3417* (2013.01); *E02F 3/431* (2013.01); *E02F 9/205* (2013.01); *E02F 9/2217* (2013.01); *Y10S 903/96* (2013.01)

(56) References Cited

U.S. PATENT DOCUMENTS

| | | | |
|---|---|---|---|
| 4,320,814 A | 3/1982 | Middelhoven | |
| 4,358,719 A | 11/1982 | Currier et al. | |
| 5,404,661 A | 4/1995 | Sahm et al. | |
| 5,769,503 A | 6/1998 | Stolarczyk et al. | |
| 5,789,896 A | 8/1998 | Fischer et al. | |
| 6,220,377 B1 | 4/2001 | Lansberry | |
| 6,469,638 B1 | 10/2002 | Johnson | |
| 6,529,812 B1 | 3/2003 | Koehrsen et al. | |
| 6,591,758 B2 | 7/2003 | Kumar | |
| 6,612,245 B2 | 9/2003 | Kumar et al. | |
| 6,612,246 B2 | 9/2003 | Kumar | |
| 6,615,118 B2 | 9/2003 | Kumar | |
| 6,633,800 B1 | 10/2003 | Ward et al. | |
| 6,922,619 B2 | 7/2005 | Baig et al. | |
| 6,922,990 B2 | 8/2005 | Naruse et al. | |
| 6,973,880 B2 | 12/2005 | Kumar | |
| 7,061,131 B2 | 6/2006 | King et al. | |
| 7,078,877 B2 | 7/2006 | Salasoo et al. | |
| 7,131,614 B2 | 11/2006 | Kisak et al. | |
| 7,137,344 B2 | 11/2006 | Kumar et al. | |
| 7,185,591 B2 | 3/2007 | Kumar et al. | |
| 7,190,133 B2 | 3/2007 | King et al. | |
| 7,227,273 B2 | 6/2007 | Ahmad et al. | |
| 7,231,877 B2 | 6/2007 | Kumar | |
| 7,302,895 B2 | 12/2007 | Kumar et al. | |
| 7,325,498 B2 | 2/2008 | Kumar et al. | |
| 7,330,012 B2 | 2/2008 | Ahmad et al. | |
| 7,349,797 B2 | 3/2008 | Donnelly et al. | |
| 7,350,876 B2 | 4/2008 | Burgess et al. | |
| 7,385,372 B2 | 6/2008 | Ahmad et al. | |
| 7,430,967 B2 | 10/2008 | Kumar | |
| 7,448,328 B2 | 11/2008 | Kumar | |
| 7,479,757 B2 | 1/2009 | Ahmad | |
| 7,500,436 B2 | 3/2009 | Kumar et al. | |
| 7,516,244 B2 | 4/2009 | Kelly et al. | |
| 7,532,640 B2 | 5/2009 | Kelly et al. | |
| 7,532,960 B2 | 5/2009 | Kumar | |
| 7,571,683 B2 | 8/2009 | Kumar | |
| 7,596,893 B2 | 10/2009 | Tozawa et al. | |
| 7,609,024 B2 | 10/2009 | Ahmad et al. | |
| 7,656,342 B2 | 2/2010 | Stolarczyk et al. | |
| 7,658,250 B2 | 2/2010 | Betz et al. | |
| 7,659,847 B2 | 2/2010 | Bausov et al. | |
| 7,667,347 B2 | 2/2010 | Donnelly et al. | |
| 7,669,534 B2 | 3/2010 | Kumar et al. | |
| 7,673,713 B2 | 3/2010 | Betz et al. | |
| 7,770,673 B2 | 8/2010 | Allen et al. | |
| 7,779,616 B2 | 8/2010 | Sheidler et al. | |
| 7,795,825 B2 | 9/2010 | Williams | |
| 7,853,388 B2 | 12/2010 | Wang | |
| 7,854,203 B2 | 12/2010 | Kumar | |
| 7,882,789 B2 | 2/2011 | Kumar et al. | |
| 7,944,081 B2 | 5/2011 | Donnelly et al. | |
| 7,949,441 B2 | 5/2011 | Baig et al. | |
| 7,950,481 B2 | 5/2011 | Betz et al. | |
| 7,956,762 B2 | 6/2011 | Bailey et al. | |
| 7,983,820 B2 | 7/2011 | Kelly et al. | |
| 7,996,163 B2 | 8/2011 | Bailey et al. | |
| 8,013,548 B2 | 9/2011 | King et al. | |
| 8,047,317 B2 | 11/2011 | Mari Curbelo et al. | |
| 8,095,285 B2 | 1/2012 | Shifferer et al. | |
| 8,112,191 B2 | 2/2012 | Kumar et al. | |
| 8,140,206 B2 | 3/2012 | Bailey et al. | |
| 8,174,225 B2 | 5/2012 | Mazumdar et al. | |
| 8,180,544 B2 | 5/2012 | Noffsinger et al. | |
| 8,186,154 B2 | 5/2012 | Nelson et al. | |
| 8,220,572 B2 | 7/2012 | Donnelly | |
| 8,253,357 B2 | 8/2012 | Bailey | |
| 8,280,569 B2 | 10/2012 | Kumar et al. | |
| 8,285,434 B2 | 10/2012 | Yanagisawa et al. | |
| 8,286,740 B2 | 10/2012 | Kagoshima et al. | |
| 8,292,015 B2 | 10/2012 | O'Quinn et al. | |
| 8,294,285 B2 | 10/2012 | Hunter | |
| 8,326,499 B2 | 12/2012 | Sopko, Jr. et al. | |
| 8,330,291 B2 | 12/2012 | Kumar | |
| 8,348,804 B2 | 1/2013 | Lane et al. | |
| 8,362,786 B2 | 1/2013 | Yamane et al. | |
| 8,371,230 B2 | 2/2013 | Kumar | |
| 8,408,144 B2 | 4/2013 | Read | |
| 8,428,796 B2 | 4/2013 | Donnelly | |
| 8,428,805 B2 | 4/2013 | Bailey et al. | |
| 8,499,909 B2 | 8/2013 | Mazumdar et al. | |
| 8,505,464 B2 | 8/2013 | Huber et al. | |
| 8,511,449 B2 | 8/2013 | Kumar | |
| 8,534,199 B2 | 9/2013 | Kumar et al. | |
| 8,536,814 B2 | 9/2013 | Mazumdar et al. | |
| 8,550,007 B2 | 10/2013 | Mazumdar et al. | |
| 8,550,008 B2 | 10/2013 | Mazumdar et al. | |
| 8,571,763 B2 | 10/2013 | Saito et al. | |
| 8,577,530 B2 | 11/2013 | Ruth et al. | |
| 8,583,303 B2 | 11/2013 | Bastien | |
| 8,587,260 B2 | 11/2013 | Kumar | |
| 8,606,444 B2 | 12/2013 | Andris | |
| 8,606,448 B2 | 12/2013 | Anders et al. | |
| 8,606,451 B2 | 12/2013 | Abdel-baqi et al. | |
| 8,610,382 B2 | 12/2013 | Goldammer et al. | |
| 8,622,860 B2 | 1/2014 | Versteyhe et al. | |
| 8,626,403 B2 | 1/2014 | Onsager et al. | |
| 8,631,890 B2 | 1/2014 | Noguchi et al. | |
| 8,649,963 B2 | 2/2014 | Young et al. | |
| 8,660,760 B2 | 2/2014 | Piipponen et al. | |
| 8,662,277 B2 | 3/2014 | Schoon | |
| 8,672,069 B2 | 3/2014 | Cherney et al. | |
| 8,684,150 B2 | 4/2014 | Kumar et al. | |
| 8,692,647 B2 | 4/2014 | Bailey et al. | |
| 8,718,889 B2 | 5/2014 | Jensen | |
| 8,768,578 B2 | 7/2014 | Kawashima et al. | |
| 9,162,560 B2 | 10/2015 | Jacobson | |
| 2002/0037211 A1 | 3/2002 | Korycan et al. | |
| 2005/0052080 A1 | 3/2005 | Maslov et al. | |
| 2005/0139399 A1 | 6/2005 | Gopal | |
| 2008/0121448 A1 | 5/2008 | Betz et al. | |
| 2010/0039054 A1 | 2/2010 | Young et al. | |
| 2010/0114404 A1 | 5/2010 | Donnelly | |
| 2010/0221071 A1 | 9/2010 | Hinshaw et al. | |
| 2010/0289443 A1 | 11/2010 | Mazumdar et al. | |

(56) References Cited

U.S. PATENT DOCUMENTS

| | | |
|---|---|---|
| 2010/0308639 A1 | 12/2010 | Cushman |
| 2011/0094808 A1 | 4/2011 | Mazumdar et al. |
| 2011/0130906 A1 | 6/2011 | Mayer |
| 2011/0175579 A1 | 7/2011 | Mazumdar |
| 2011/0224859 A1 | 9/2011 | Pipponen et al. |
| 2011/0301794 A1 | 12/2011 | Bastien |
| 2011/0307127 A1 | 12/2011 | Swenson et al. |
| 2012/0001743 A1 | 1/2012 | Cotten et al. |
| 2012/0146387 A1 | 6/2012 | Shatters |
| 2012/0161497 A1* | 6/2012 | He .................. B60K 7/0007 301/6.5 |
| 2012/0257424 A1 | 10/2012 | Mazumdar et al. |
| 2012/0273285 A1 | 11/2012 | Jensen et al. |
| 2012/0298004 A1 | 11/2012 | Osara et al. |
| 2012/0305025 A1 | 12/2012 | Helbig et al. |
| 2012/0316717 A1 | 12/2012 | Daum et al. |
| 2013/0099561 A1 | 4/2013 | Raman |
| 2013/0154523 A1 | 6/2013 | Brown et al. |
| 2013/0206490 A1 | 8/2013 | Kouvo et al. |
| 2013/0220714 A1 | 8/2013 | Rudinec |
| 2013/0226419 A1 | 8/2013 | Jensen |
| 2013/0228377 A1 | 9/2013 | Kuittinen et al. |
| 2013/0231806 A1 | 9/2013 | Bailey et al. |
| 2013/0248262 A1 | 9/2013 | Kumar et al. |
| 2013/0307443 A1 | 11/2013 | Hirozawa |
| 2013/0307489 A1 | 11/2013 | Kusch et al. |
| 2013/0325269 A1 | 12/2013 | Izumi et al. |
| 2013/0338885 A1 | 12/2013 | Kirk et al. |
| 2014/0021779 A1 | 1/2014 | Teichmann |
| 2014/0032006 A1 | 1/2014 | Tojima et al. |
| 2014/0046538 A1 | 2/2014 | Siegel et al. |
| 2014/0084666 A1 | 3/2014 | Niederriter et al. |
| 2015/0081147 A1 | 3/2015 | Kawaguchi |
| 2015/0086315 A1 | 3/2015 | Hirozawa |
| 2016/0347163 A1 | 12/2016 | Dorsett et al. |

FOREIGN PATENT DOCUMENTS

| | | |
|---|---|---|
| CN | 103174185 | 6/2013 |
| CN | 104196079 | 12/2014 |
| EP | 1505213 | 2/2005 |
| JP | 2004229394 | 8/2004 |
| JP | 2008062822 | 3/2008 |
| KR | 10-2010-0035265 | 4/2010 |
| WO | WO 2005119894 | 12/2005 |
| WO | WO 2006121761 | 11/2006 |
| WO | WO 2008076694 | 6/2008 |
| WO | WO 2009103119 | 8/2009 |
| WO | 2010145021 | 12/2010 |
| WO | 2014120930 | 8/2014 |

OTHER PUBLICATIONS

Schepmann, "Ultracapacitor Heavy Hybrid Vehicle: Model Predictive Control Using Future Information to Improve Fuel Consumption," theses (2010) 179 pages, Clemson University.

PCT/US2016/034670 International Search Report and Written Opinion dated Aug. 30, 3016 (10 pages).

* cited by examiner

MINING MACHINE AND ENERGY STORAGE SYSTEM FOR SAME

CROSS-REFERENCE TO RELATED APPLICATIONS

This application claims the benefit of, prior-filed U.S. Provisional Patent Application No. 62/167,814, filed May 28, 2015, and, prior-filed U.S. Provisional Patent Application No. 62/167,808, filed May 28, 2015. The entire contents of these documents are hereby incorporated by reference.

BACKGROUND

The present disclosure generally relates to mining machines, and specifically energy storage devices for mining machines.

SUMMARY

Diesel electric mining machines typically include generators for producing electrical energy. One or more generators may be powered by one or more engines, which produce air pollution emissions. In some embodiments, the generators can also function as motors and can increase the speed of one or more engines. Rotating components of an engine can store energy during an off-peak phase of a mining operation and discharge the energy during a peak phase in order to reduce overall energy requirements.

In one aspect, a mining machine includes an engine and an energy storage device having a flywheel or another form of kinetic energy storage system ("KESS"). The KESS can be used with switched reluctance ("SR") technology to store energy in a kinetic form for later use. One or more KESSs may be implemented in a high power, mining traction application, and may be used on surface machines and/or underground machines incorporating SR technology. When the traction system has a net energy surplus, the flywheel stores kinetic energy proportional to the rotational moment of inertia of the flywheel. In one embodiment, this is represented by an increase in voltage on a capacitive DC bus and occurs when braking or torque opposite to a direction of rotation is applied to a motor or element of the traction system. During periods of peak energy demand, the flywheel is discharged and may provide primary energy to a mining machine, while the engine assists by providing additional energy when necessary. The combination of the flywheel and engine may reduce engine emissions, reduce fuel consumption, and reduce overall cost. The energy storage device includes a housing, a rotor shaft extending through the housing, each end of the rotor shaft supported for rotation by a bearing. The energy storage device further includes a stator extending around a portion of the rotor shaft. A flywheel is coupled to the rotor shaft between the bearings such that the flywheel is offset from the stator along an axis of the rotor shaft.

In one aspect, a mobile mining machine includes a plurality of traction elements, a plurality of motors, a power source in electrical communication with the plurality of motors, and an energy storage system in electrical communication with the plurality of motors and the power source. Each of the motors is coupled to an associated one of the plurality of traction elements. Each of the motors is configured to be driven by the associated traction element in a first mode, and each of the motors is configured to drive the associated traction element in a second mode. The energy storage system includes a shaft defining a shaft axis, a rotor secured to the shaft, a stator extending around the rotor and around the shaft axis, and a flywheel coupled to the shaft for rotation therewith. In the first mode, rotation of the plurality of motors causes rotation of the flywheel to store kinetic energy. In the second mode, rotation of the rotor and the flywheel discharges kinetic energy to drive the plurality of motors.

In another aspect, a mobile haulage vehicle includes a chassis, a boom including a first end pivotably coupled to the chassis and a second end, an attachment coupled to the second end of the boom, and a drive system. The drive system includes a bi-directional electrical bus, a plurality of traction elements supporting the chassis, a plurality of motors, a switched reluctance motor in electrical communication with the plurality of motors via the bus, and an energy storage system in electrical communication with the plurality of motors and the switched reluctance motor via the bus. Each motor is coupled to an associated one of the plurality of traction elements and in electrical communication with the bus. Each motor is configured to be driven by the associated traction element in a first mode, and each motor is configured to drive the associated traction element in a second mode. The energy storage system includes a housing secured to the chassis, a shaft, a rotor secured to the shaft, a stator, and a flywheel coupled to the shaft for rotation therewith. The shaft defines a shaft axis and is supported for rotation relative to the housing. The stator extends around the rotor and around the shaft axis. In the first mode, rotation of the plurality of motors transmits electrical energy to the energy storage system via the bus, the electrical energy driving rotation of the flywheel to store kinetic energy. In the second mode, rotation of the rotor and the flywheel transmits electrical energy to the motors via the bus, driving the plurality of motors.

In yet another aspect, a drive system for a haulage vehicle includes a bi-directional electrical bus, a plurality of wheels, a plurality of motors, a plurality of power converters, a switched reluctance motor in electrical communication with the plurality of motors via the bus, an engine coupled to the switched reluctance motor, and an energy storage system in electrical communication with the plurality of motors and the switched reluctance motor via the bus. Each motor is coupled to an associated one of the plurality of wheels and is in electrical communication with the bus. Each motor is configured to be driven by the associated wheel in a first mode, and each motor is configured to drive the associated wheel in a second mode. Each power converter provides electrical communication between the bus and one of the motors. The switched reluctance motor is coupled to at least one hydraulic pump for driving at least one auxiliary actuator. The energy storage system includes a housing, a shaft defining a shaft axis and supported for rotation relative to the housing, a rotor secured to the shaft, a stator, and a flywheel coupled to the shaft for rotation about the shaft axis. The stator extends around the rotor and around the shaft axis.

The present invention provides advantages over the prior art. Such advantages include, but are not limited to, capturing and releasing energy at high power levels and extending the operating life of mining machines.

DETAILED DESCRIPTION

Before any embodiments are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, aspects may be implemented in software (e.g., stored on non-transitory computer-readable medium) executable by one or more processing units, such as a microprocessor and/or an application specific integrated circuits ("ASICs"). As such, it should be noted that a plurality of hardware and software based devices, as well as a plurality of different structural components may be utilized to implement the invention. For example, "controllers" described in the specification can include one or more processing units, one or more computer-readable medium modules, one or more input/output interfaces, and various connections (e.g., a system bus) connecting the components.

Figure 1:
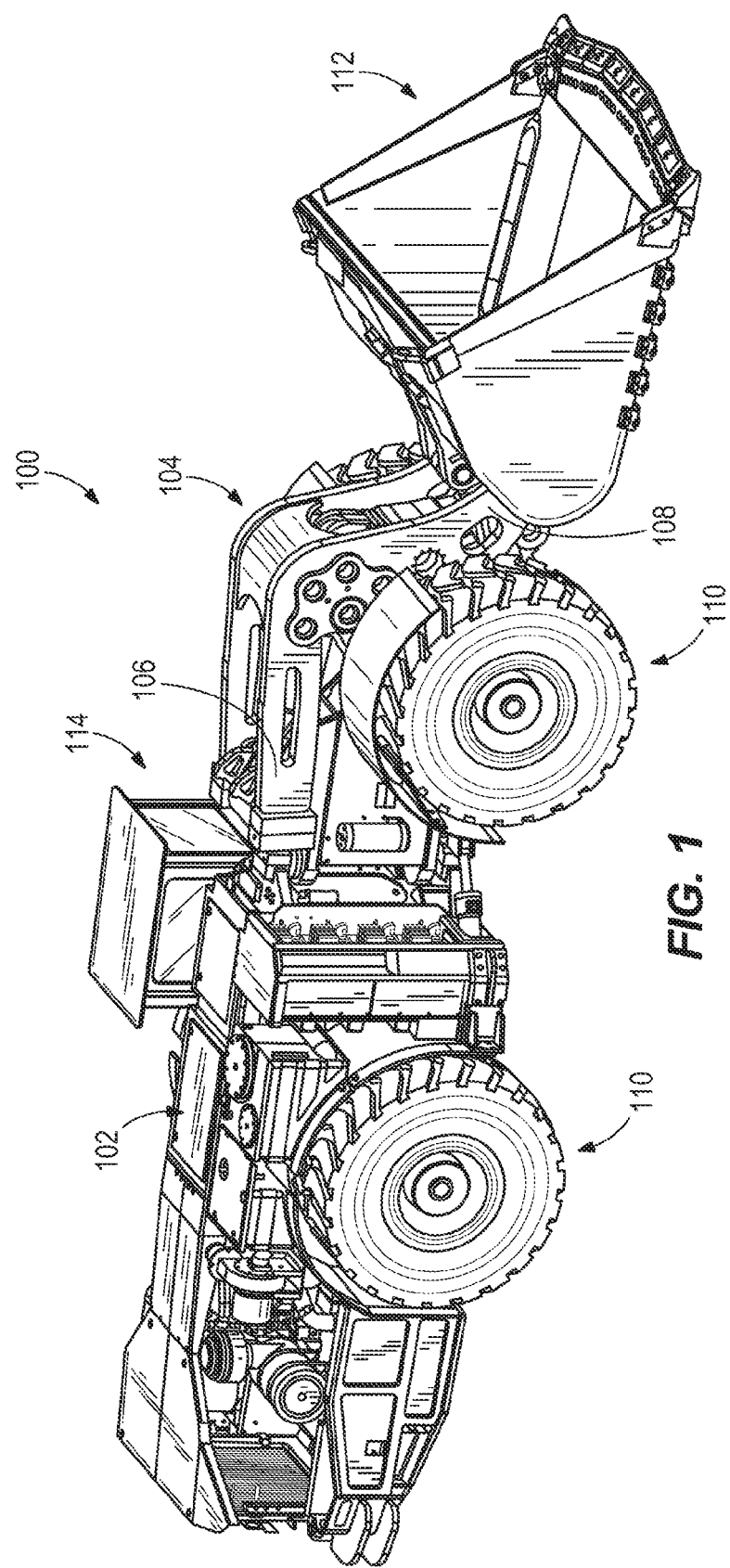
FIG. 1 is a perspective view of a mining machine according to one embodiment.
Figure 2:
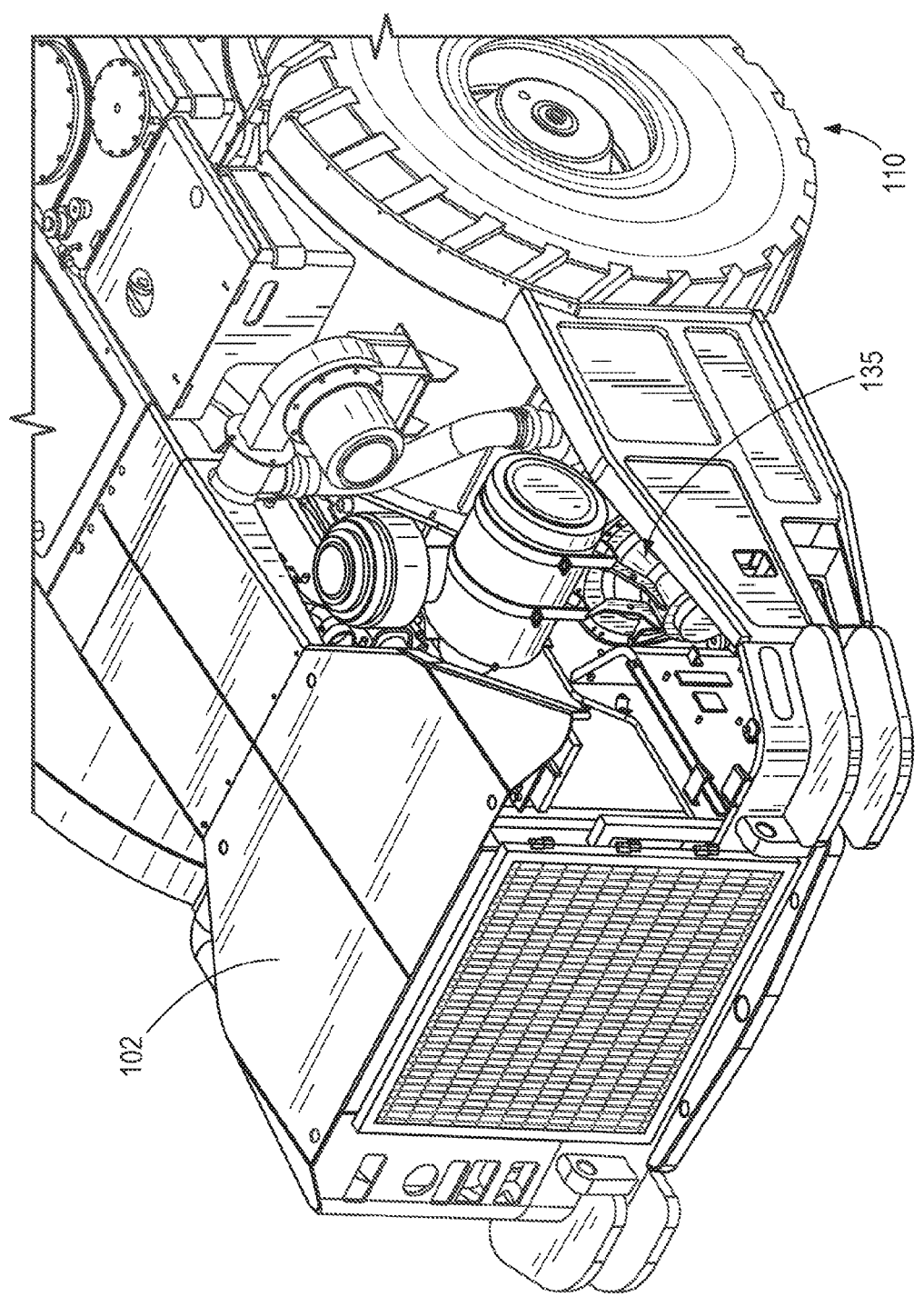
FIG. 2 is a perspective view of a portion of the mining machine of FIG. 1.
Figure 3:
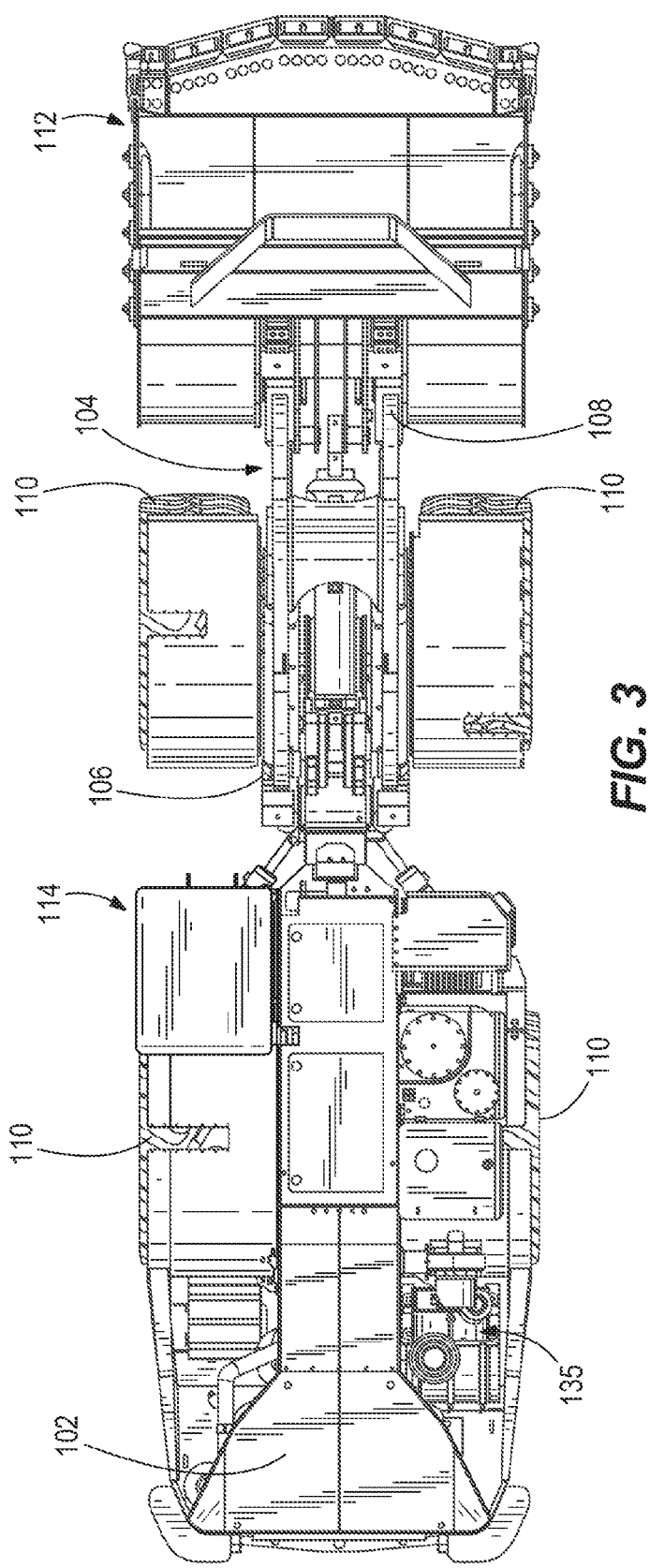
FIG. 3 is a plan view of the mining machine of FIG. 1.

FIGS. 1-3 illustrate a mining machine 100 according to one embodiment. In the illustrated embodiment, the mining machine 100 is a load-haul-dump ("LHD") machine. The machine 100 can be an underground mining machine (e.g., a continuous miner, a haulage system, a longwall shearer, a loader, etc.) or a surface mining machine (e.g., a wheel loader, a hybrid shovel, a dragline miner, etc.). In the illustrated embodiment, the mining machine 100 further includes a chassis 102, boom 104 having a first end 106 coupled to the chassis 102 and a second end 108 coupled to an attachment 112 (e.g., a bucket). In the illustrated embodiment, the chassis 102 also includes an operator cab 114. The mining machine 100 further includes traction elements, such as wheels 110, rotatably coupled to the chassis 102 and supporting the chassis 102 for movement over the ground. As shown in FIG. 2, a kinetic energy storage system ("KESS") or energy storage device 135 is supported on the chassis 102. In the illustrated embodiment, the energy storage device 135 is positioned proximate an end of the chassis 102 opposite the attachment 112.

Figure 4:
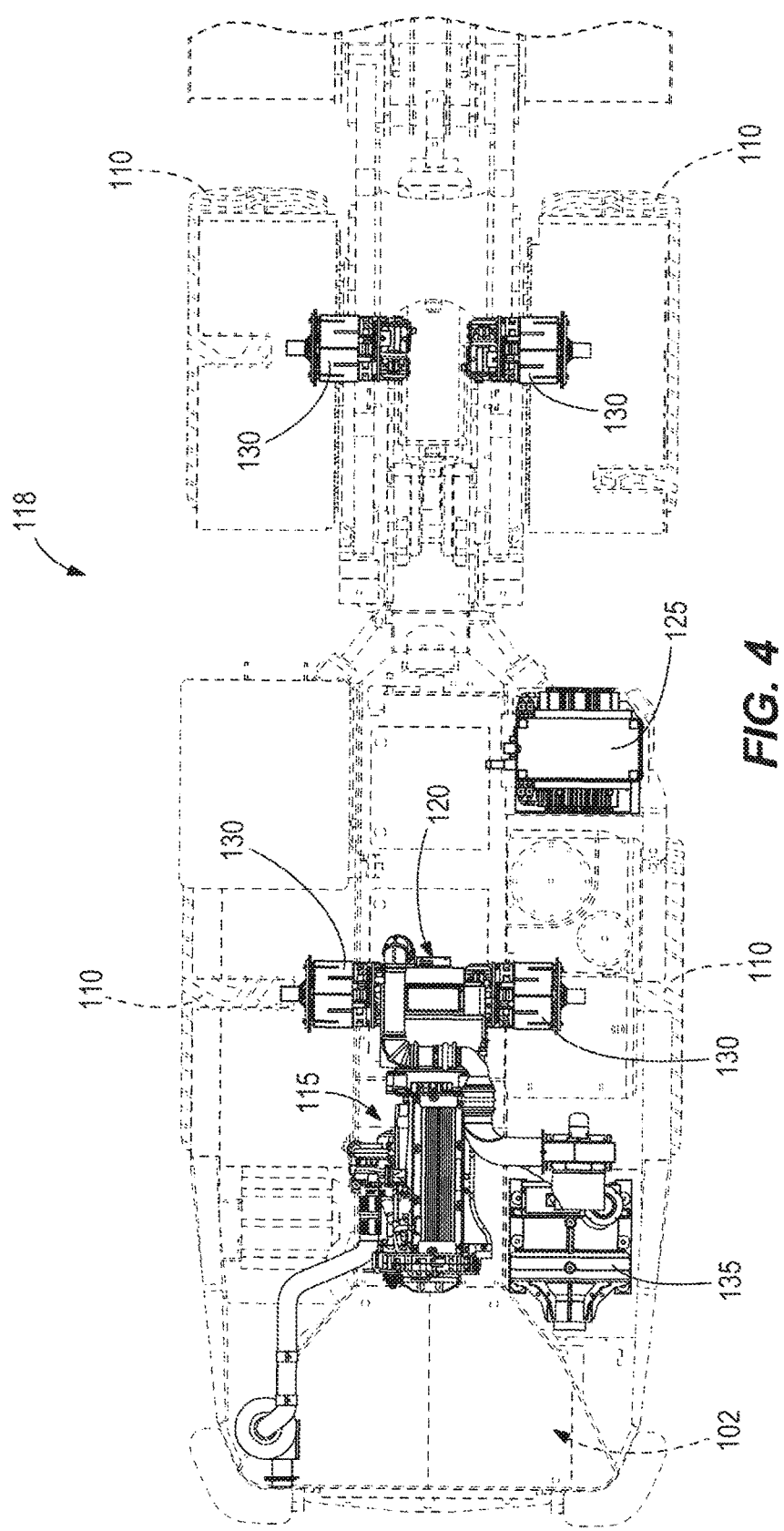
FIG. 4 is a plan view of a drive train of the mining machine of FIG. 1.

FIG. 4 illustrates the primary components of the drive system or drive train 118 of the mining machine 100. The drive train 118 may include an engine 115, a generator 120, a power converter 125, motors 130, and the energy storage device 135. In some embodiments, the machine 10 may include multiple power converters, multiple motors, and/or multiple energy storage devices. The engine 115 provides power, in the form of mechanical energy, to the generator 120. In some embodiments, the engine 115 is a diesel engine. In some embodiments, the engine 115 provides an average power output of 180 horsepower ("Hp") and a peak power output of 300 Hp. As discussed in further detail below, the energy storage device 135 can be used as a power averaging device, discharging stored energy during periods of peak power demand. The energy storage device 135 may supplement power supplied by the engine 115 in order to reduce the need to operate the engine 115 at peak power output.

The generator 120 converts mechanical energy received from the engine 115 into electrical energy. In some embodiments, the generator 120 is a switched reluctance ("SR") motor/generator. In other embodiments, the generator 120 is another type of direct current ("DC") motor/generator. In other embodiments, the generator 120 is an alternating current ("AC") motor/generator. In some embodiments, the generator 120 can also be used as a motor that increases the revolutions per minute ("RPM") of the engine 115 (e.g., as an energy storage mechanism used separately or in combination with the energy storage device 135 described below).

Figure 5A:
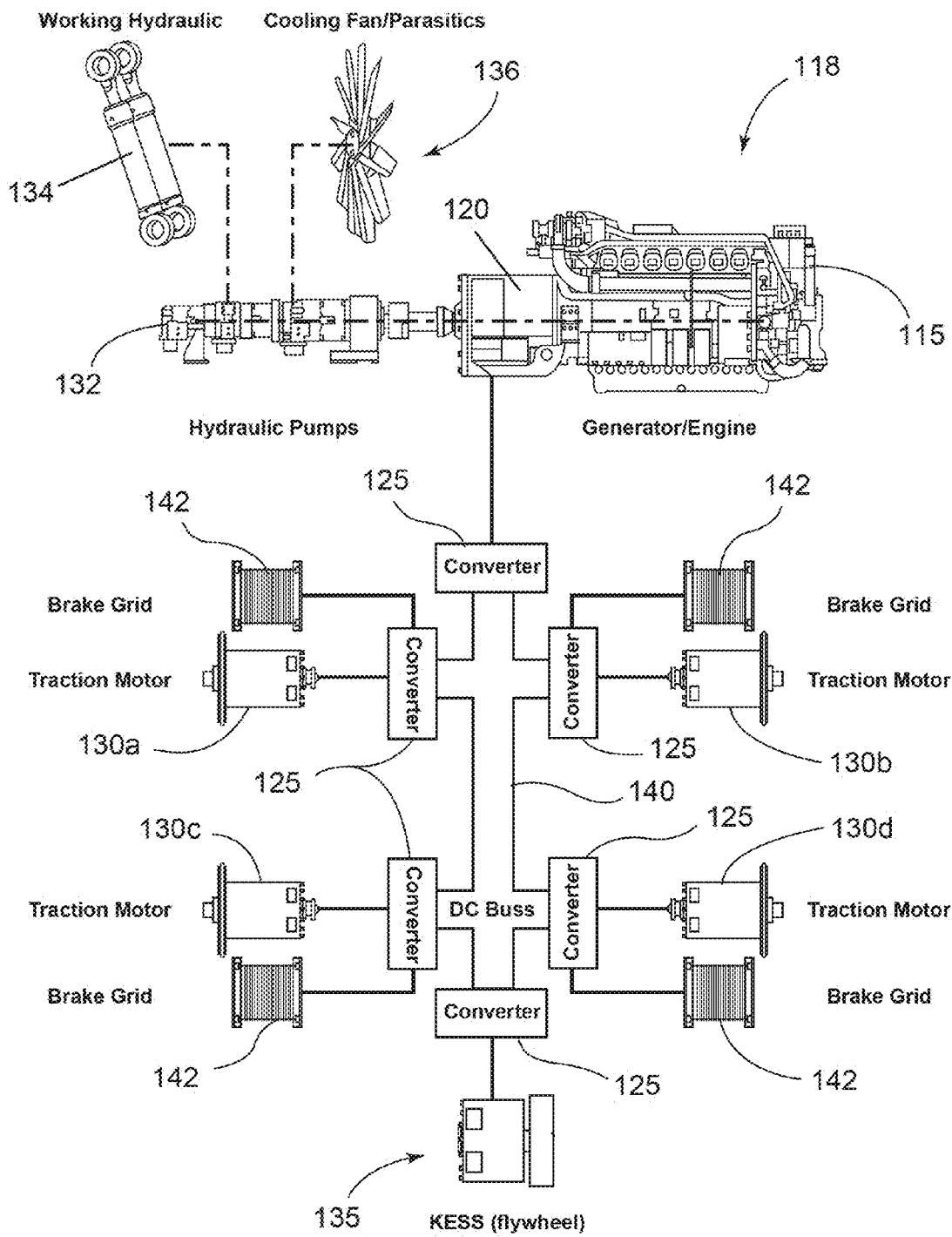
FIG. 5A is a schematic view of a drive train.

FIG. 5A schematically illustrates the components of a drive train for the mining machine 100. In the illustrated embodiment, the generator 120 transmits power to a converter 125 that converts a received energy into a second energy via a bus 140 (e.g., a DC bus). The bus 140 is in communication with additional converters 125, each of which transmits the second energy output to a traction motor 130. The converters 125 can be configured to transmit energy through the bus 140 or to receive power from the bus 140. The traction motors 130 convert electrical energy into rotational energy or torque to drive the wheels 110 (FIG. 2A) or other components of the mining machine 100. In some embodiments, the motors 130 include a motor for each wheel 110 of the machine 100. Each traction motor 130 is associated with a braking grid 142 that converts kinetic energy from the traction motor 130 into thermal energy when brakes are applied to slow down the machine 100. In the illustrated embodiment of mining machine 100, the motors 130 include a left-front ("LF") motor 130*a*, a right-front motor ("RF") 130*b*, a left-rear ("LR") motor 130*c*, and a right-rear ("RR") motor 130*d*. The motors 130 are used to propel (forward and reverse), brake (forward and reverse), and control tire slip.

In some embodiments, one or more of the motors 130 are switched-reluctance ("SR") motors. In such an embodiment, the SR motor may provide full torque at stall (i.e., when the output rotational speed is zero) while consuming a small percentage of the power output of the engine 115, which saves fuel consumption and reduces emissions. It should be understood that in other embodiments, the mining machine 100 can include fewer or additional motors.

Referring to FIG. 5A, the generator 120 is also in communication with one or more components of the mining machine 100. These components may operate other aspects of the machine 100 (e.g., actuating a loading bucket or driving a cutter head). For example, in some embodiments, the generator 120 converts electrical energy to mechanical energy that drives one or more hydraulic components 132 (e.g., pumps and/or valves). The hydraulic components 132 supply hydraulic energy to the hydraulic systems such as actuators 134. The hydraulic systems can perform hoisting, steering, rotating, and/or other auxiliary functions of the mining machine 100. The hydraulic components 132 may also operate parasitic components 136, such as a cooling fan.

In one embodiment, the energy storage device 135 may be charged by capturing braking energy from the traction system and/or by receiving power from the engine 115 and generator 120 during times of low power demand. The energy storage device 135 receives and stores electrical energy from the generator 120 via the bus 140. The energy storage device 135 also outputs stored electrical energy to other components of the mining machine 100 (e.g., the converters 125, the motors 130, a hydraulic system, etc.). In operation, each energy storage device 135 is configured to store electrical energy when there is available (i.e., excess) power from the engine 115 and output stored energy when energy demand is greater than the engine 115 can provide. In some embodiments, the energy storage device 135 includes a SR motor/generator (e.g., variable speed SR motor/generator).

In one embodiment, the primary energy source for the energy storage device 135 is the traction system. When the components (e.g., the wheels 110 and motors 130) of the traction system are braking or slowing down, the energy of the slowing wheels is transmitted to the energy storage device 135 and stored as rotational energy in an inertial mass (i.e., flywheel 180).

Figure 5B:
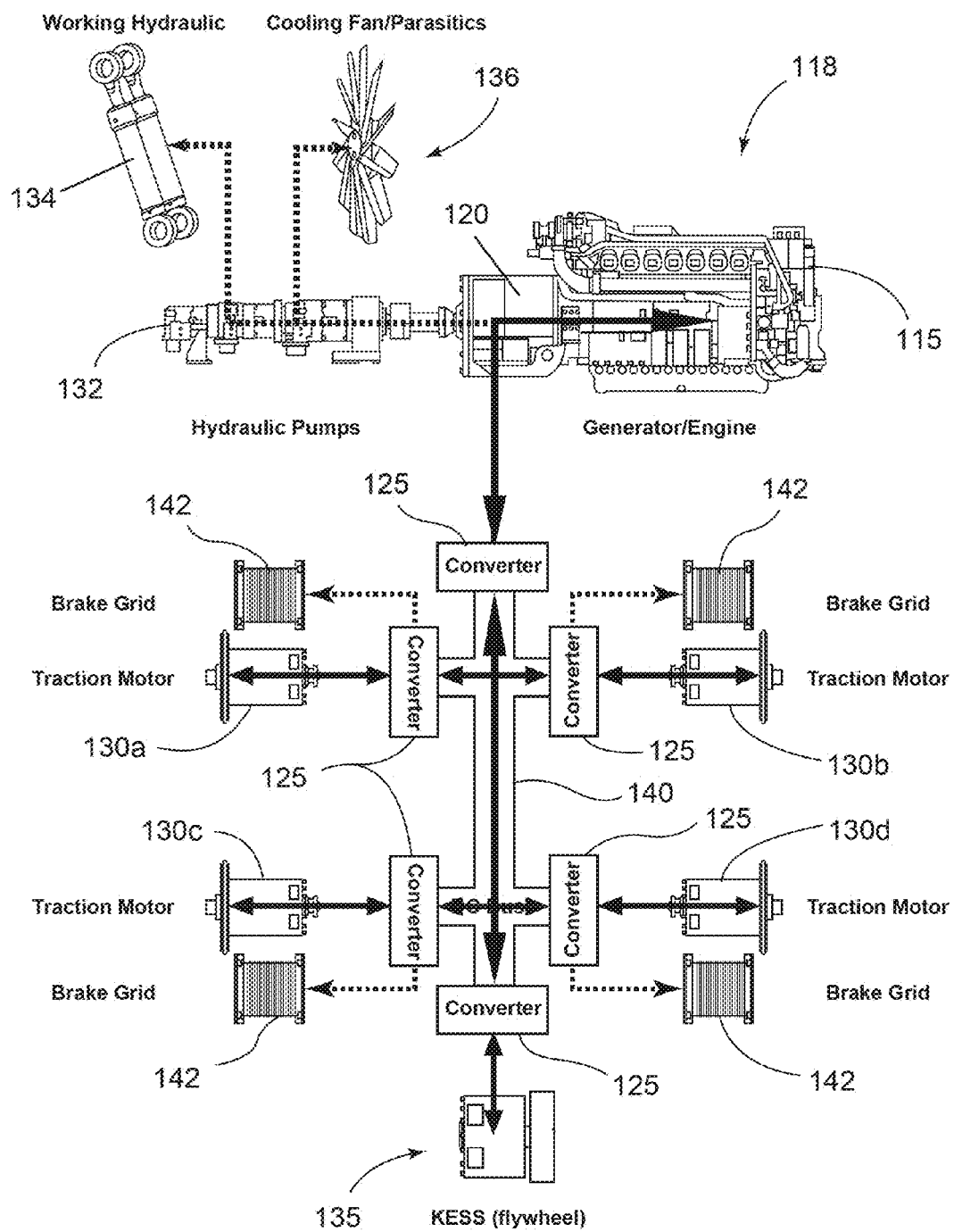
FIG. 5B is a schematic view of potential power transmission paths in the drive train of FIG. 2A.

FIG. 5B illustrates various potential power transmission paths through the drive train 118. For example, the generator 120 and engine 115 can provide power to the hydraulic pumps 132, and the generator 120 can also receive energy from the bus 140 (e.g., when the traction system is braking). Also, each motor 130 can receive energy from the bus 140 and supply energy to the bus 140. Similarly, the energy storage device 135 can receive energy from the bus 140 and supply energy to the bus 140. In some embodiments, each motor 130 may include a mechanical brake (not shown). When a controller detects that the mechanical brake of the motor 130 is engaged, the speed of the motor 130 is retarded or reduced to inhibit propulsion of the machine. Braking mechanisms (e.g., braking grid resistors 142) may receive energy from the bus 140 and dissipate the energy as heat.

Figure 5C:
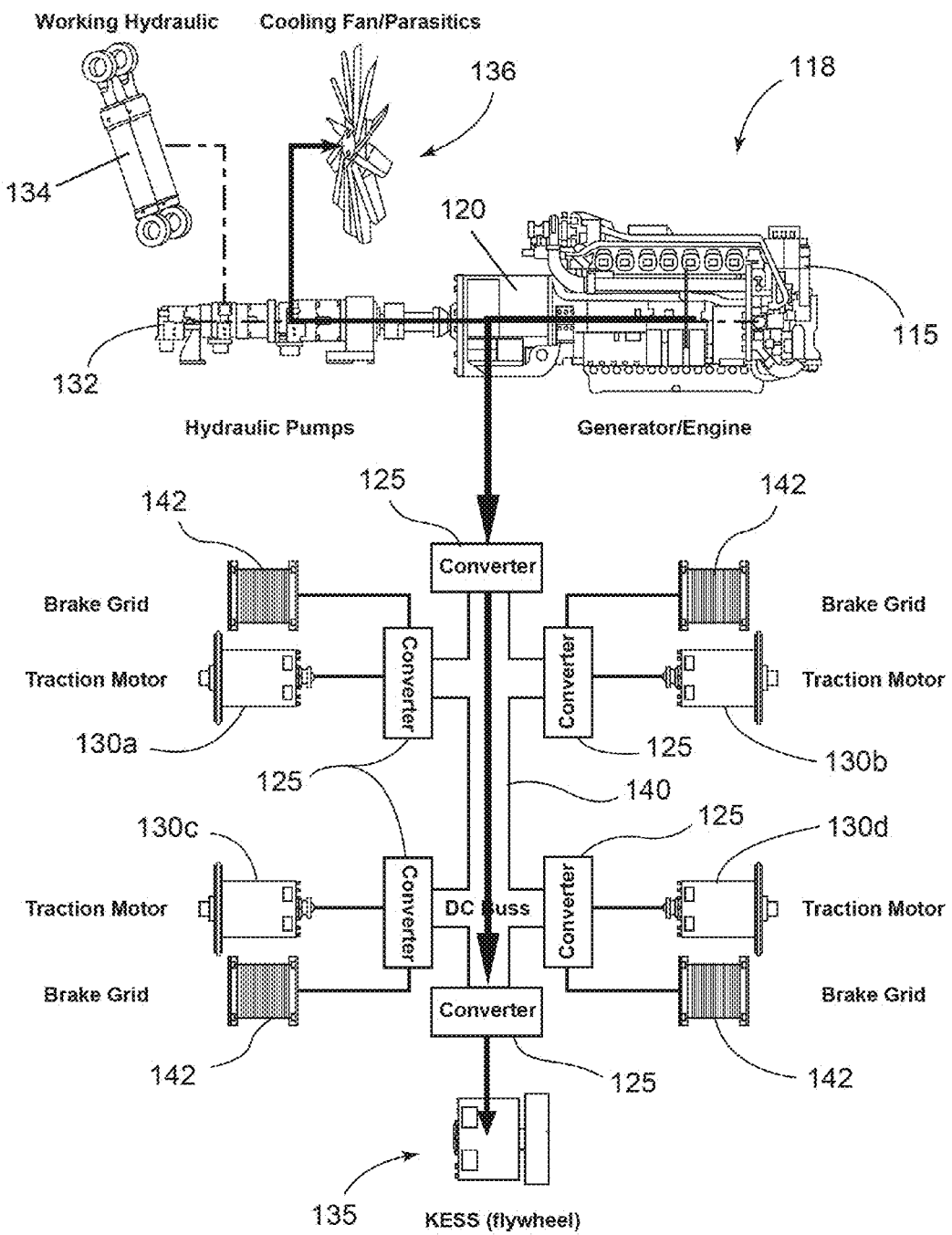
FIG. 5C is a schematic view of a drive train during a charging mode.

FIG. 5C illustrates a power flow path through the drive train 118 when the energy storage system 135 is charged. Power supplied by the generator 120 is provided to the bus 140, which transmits power to the energy storage device 135. In some embodiments, the energy storage device 135 is charged during start-up of the machine 100. The energy storage device 135 may be charged during times of low load on the generator 120 (i.e., the generator 120 receives surplus energy from the engine 115 than is required to operate the traction motors 130 or the other components of the machine 100).

Figure 5D:
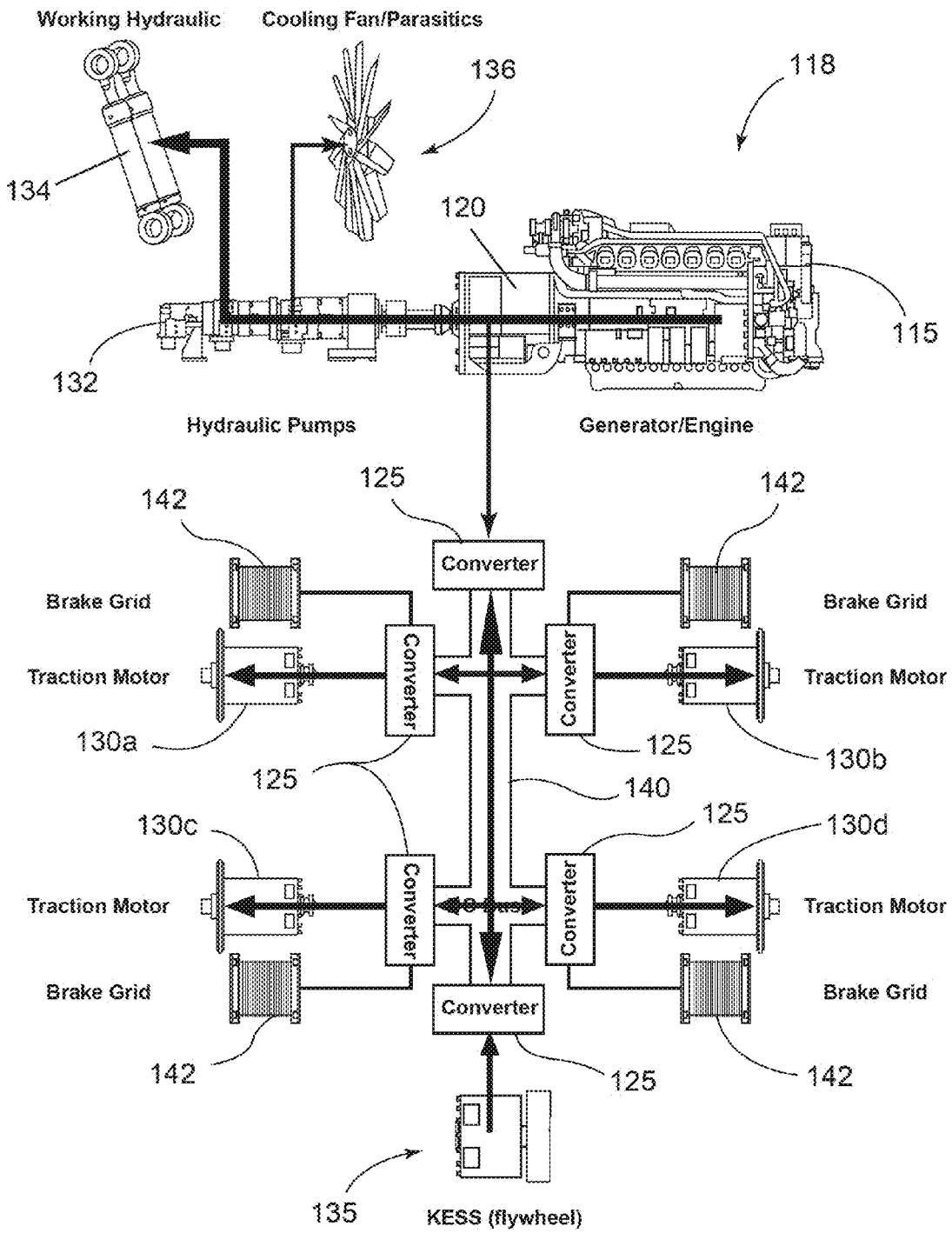
FIG. 5D is a schematic view of a drive train during a discharge mode of an energy storage device.

FIG. 5D illustrates a power flow path through the drive train 118 when the traction motors 130 are driven to propel the machine 100. The energy storage device 135 can discharge and transmit power to the bus 140, which transmits the power to the motors 130 to drive the wheels 110. In some embodiments, the energy storage device 135 acts as the primary or master power source for the motors 130 and provides all of the energy required to drive the motors 130. If the energy storage device 135 cannot supply all of the energy required by the motors 130, the generator 120 and engine 115 supply additional power to the bus 140 that can be consumed by the motors 130. In this arrangement the energy storage device 135 is the primary power supply for the motors 130 and the generator 120 provides auxiliary or backup power.

In one embodiment, the energy storage device 135 is a more responsive power source than the generator 120. The drive train 118 relies on the most responsive power source first, allowing the traction system to accelerate and decelerate faster than a conventional drive system. Furthermore, using the energy storage system 135 as the primary energy source reduces the need to operate the engine 115 at its full output. Rather, using the energy storage device 135 as the primary power source to the traction system allows the engine 115 to operate at a steadier output, thereby reducing fuel consumption, engine output requirements, and engine wear 115.

Figure 5E:
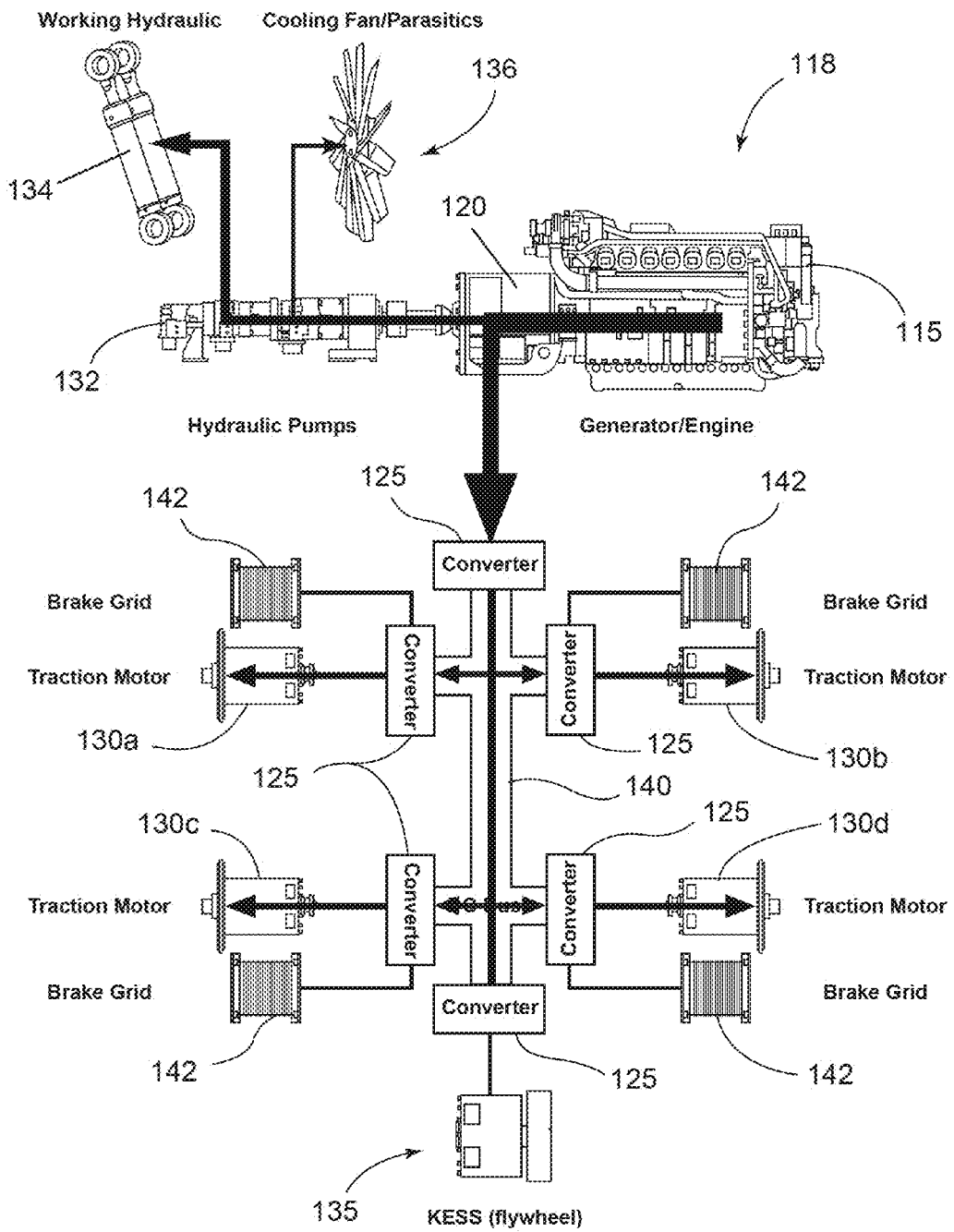
FIG. 5E is a schematic view of a drive train during a drive mode.

In another mode of operation, shown in FIG. 5E, the drive train 118 may operate the traction motors 130 without using the energy storage device 135. That is, the energy supplied to the motors 130 via the bus 140 is supplied solely by the generator 120. This mode may be implemented when the energy storage device 135 is not charged, is malfunctioning, or is not present.

Figure 5F:
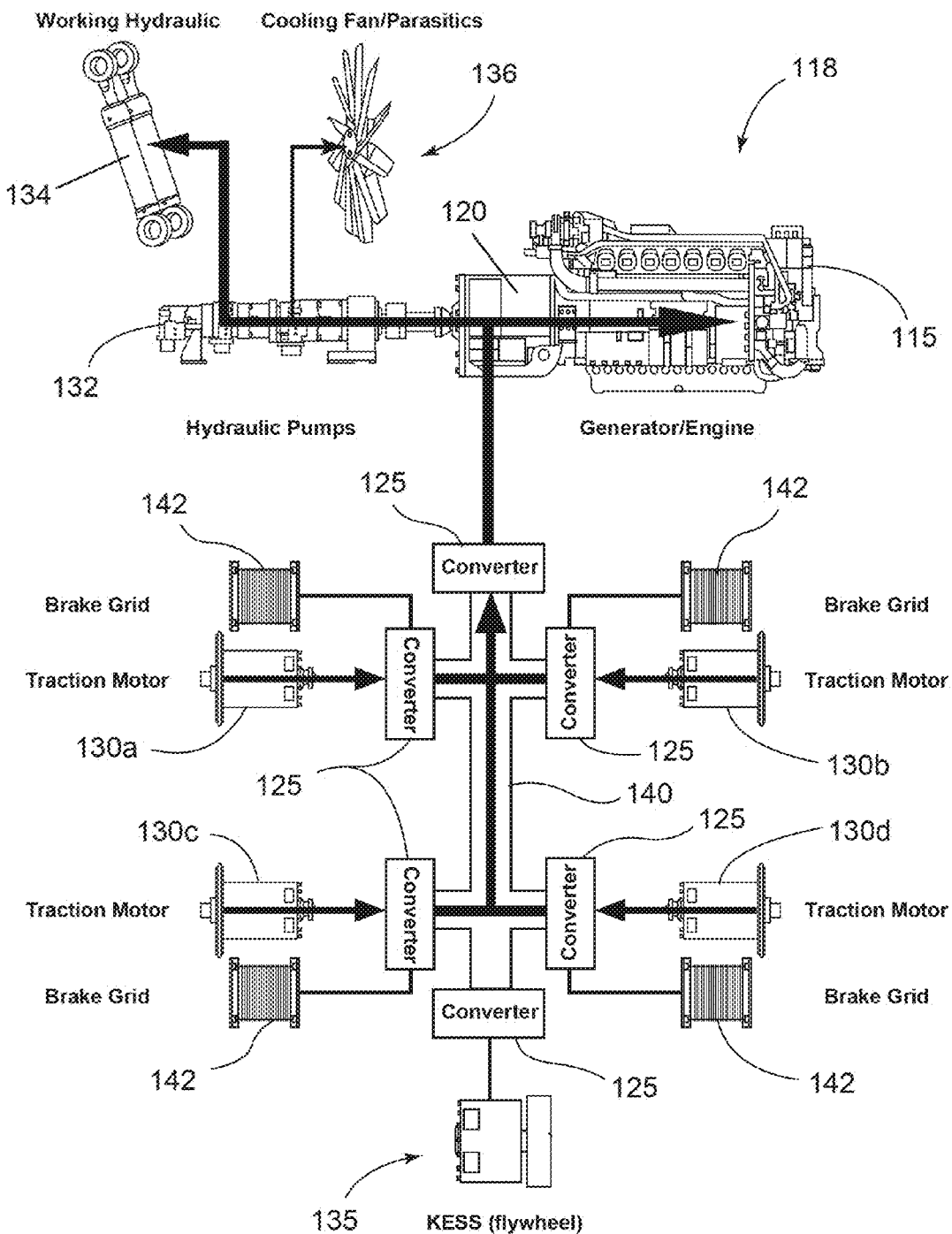
FIG. 5F is a schematic view of a drive train during a light braking mode.
Figure 5G:
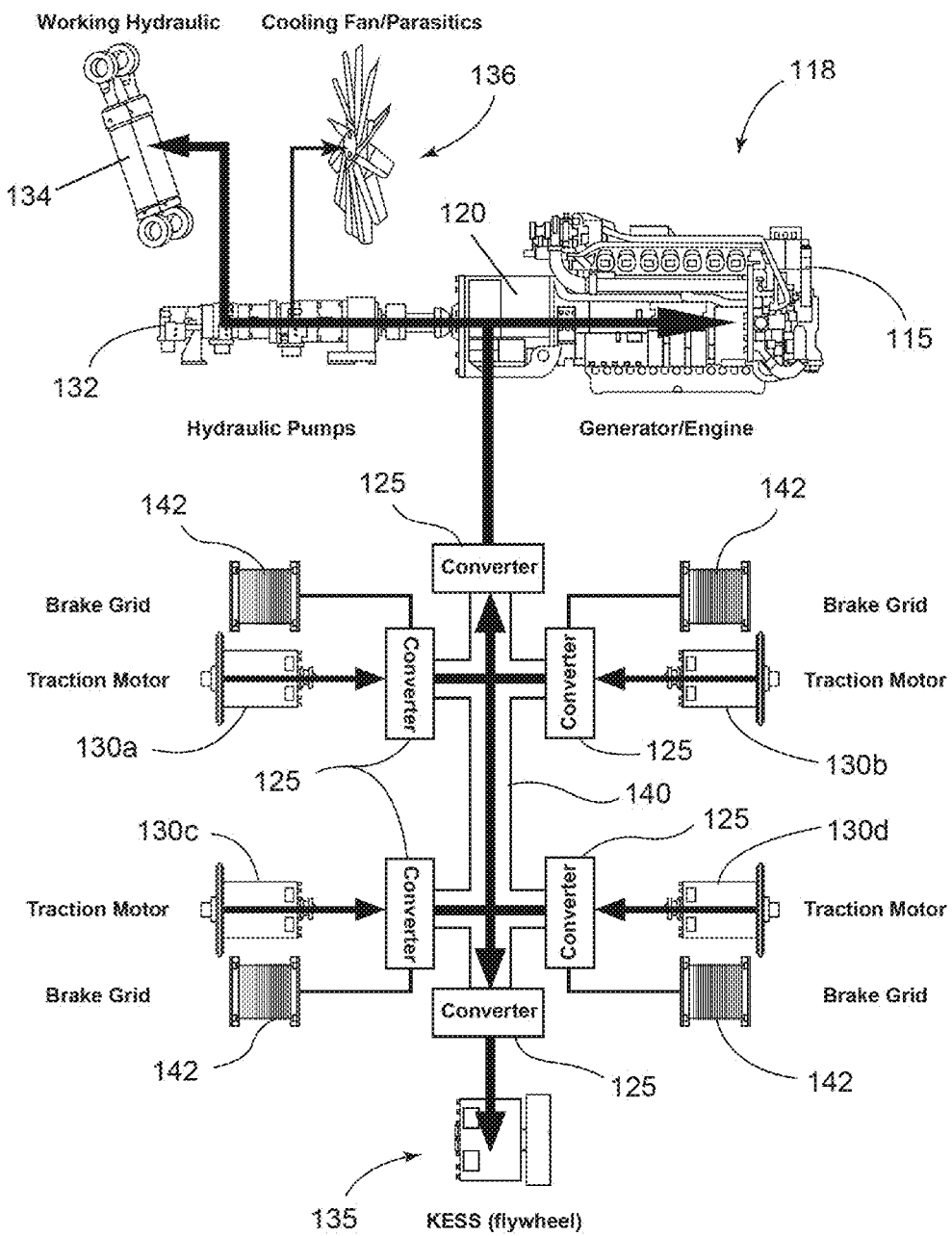
FIG. 5G is a schematic view of a drive train during a heavy braking and charging mode.
Figure 5H:
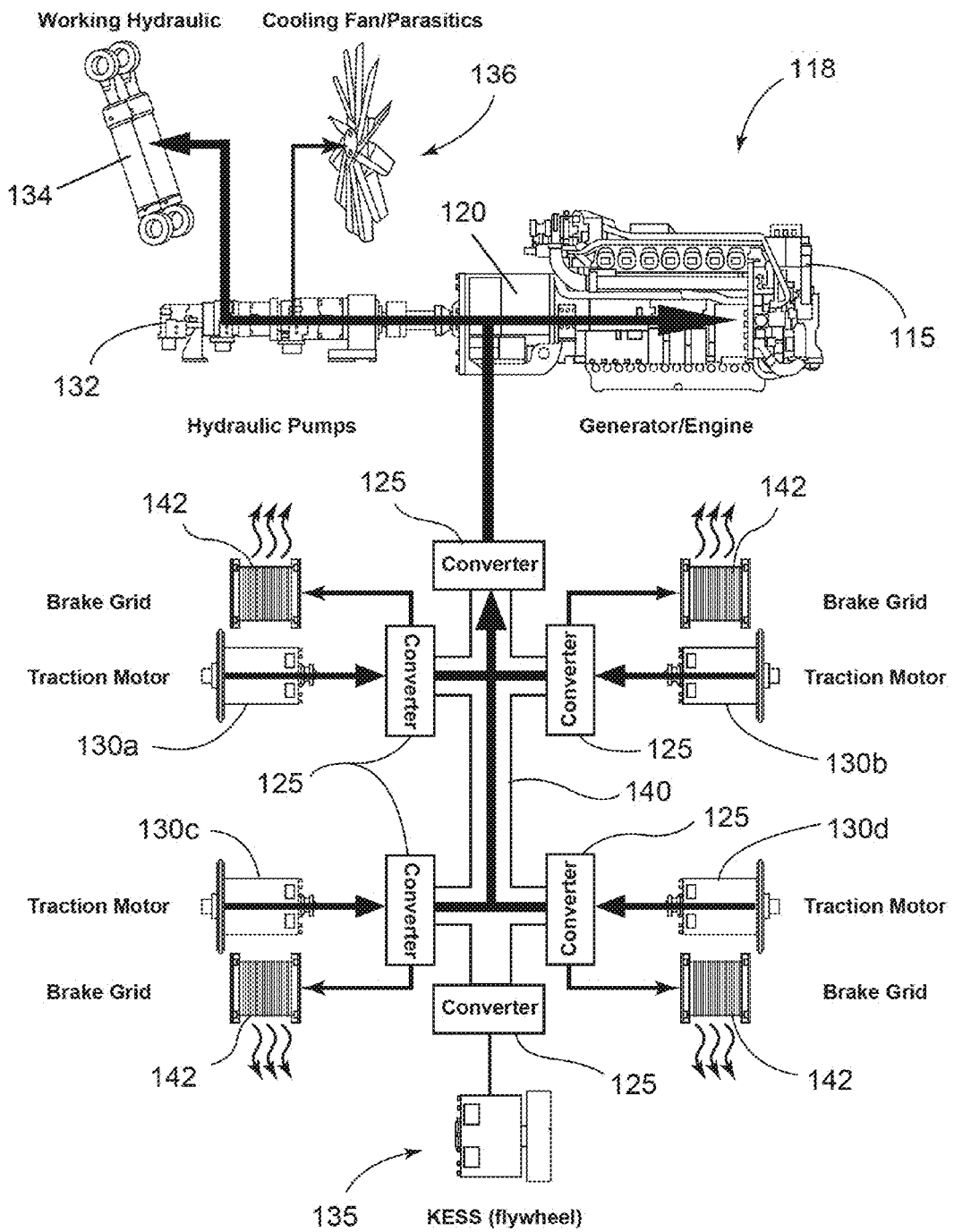
FIG. 5H is a schematic view of a drive train during a heavy braking mode without charging an energy storage device.

FIGS. 5F-5H illustrate power flow paths when the machine 100 is braking and the motors 130 act as generators supplying electrical energy to the bus 140. During light braking (FIG. 5D), the energy supplied by the motors 108 can be supplied to the generator 120. The generator 120 can use the received energy to speed up the drive line between the generator 120 and the hydraulic pumps 132 (e.g., to speed up the engine 115 to a set speed at which fuel injectors are programmed to cease delivering fuel to the engine 115). In some situations, this mode of operation reduces engine fuel consumption (e.g., to operate at zero fuel or near-zero fuel levels).

During heavy braking, shown in FIG. 5G, the motors 130 may generate more energy than the energy generated during light braking. Therefore, the energy generated by the motors 130 and supplied to the bus 140 may be transmitted to both the generator 120 and to charging the energy storage device 135. In another mode (FIG. 5H), the motors 130 may perform heavy braking without charging the energy storage device 135 (e.g., the energy storage device 135 is full, malfunctioning, or not present). Although some of the power supplied to the bus 140 from the motors 130 is transmitted to the generator 120, additional or excess energy can be supplied to one or more of the braking grids 142 to dissipate the energy as heat.

Other modes of operation can be used with the energy storage device 135. For example, in some embodiments, the generator 120 can be used as the primary power source of the traction system and the energy storage device 135 can provide backup power. A controller can be incorporated and programmed to control the energy storage device 135 based on the operating speed of the traction system.

Figure 6:
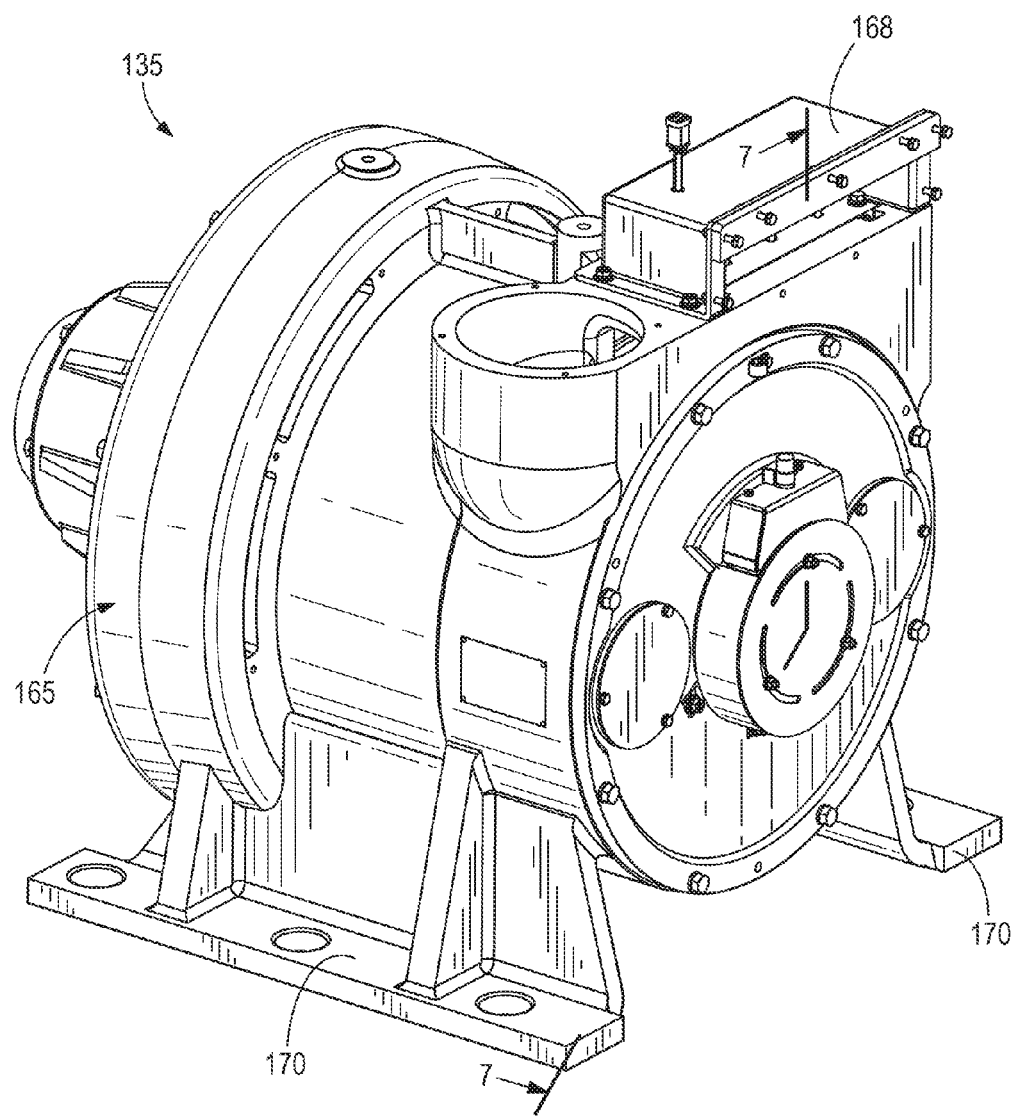
FIG. 6 is a perspective view of an energy storage system.
Figure 7:
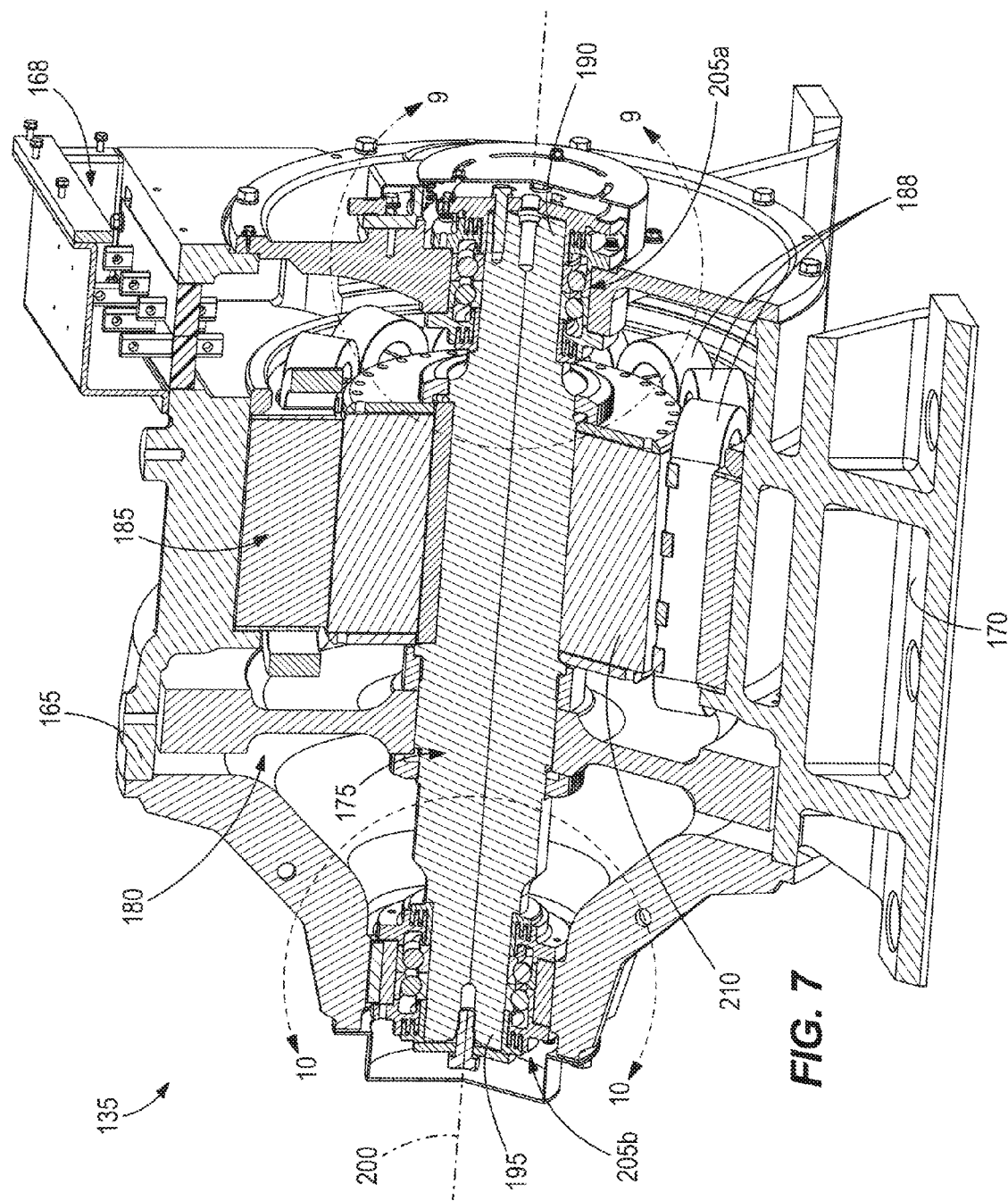
FIG. 7 is a side section view of the energy storage system of FIG. 6 viewed along section 7-7.
Figure 8:
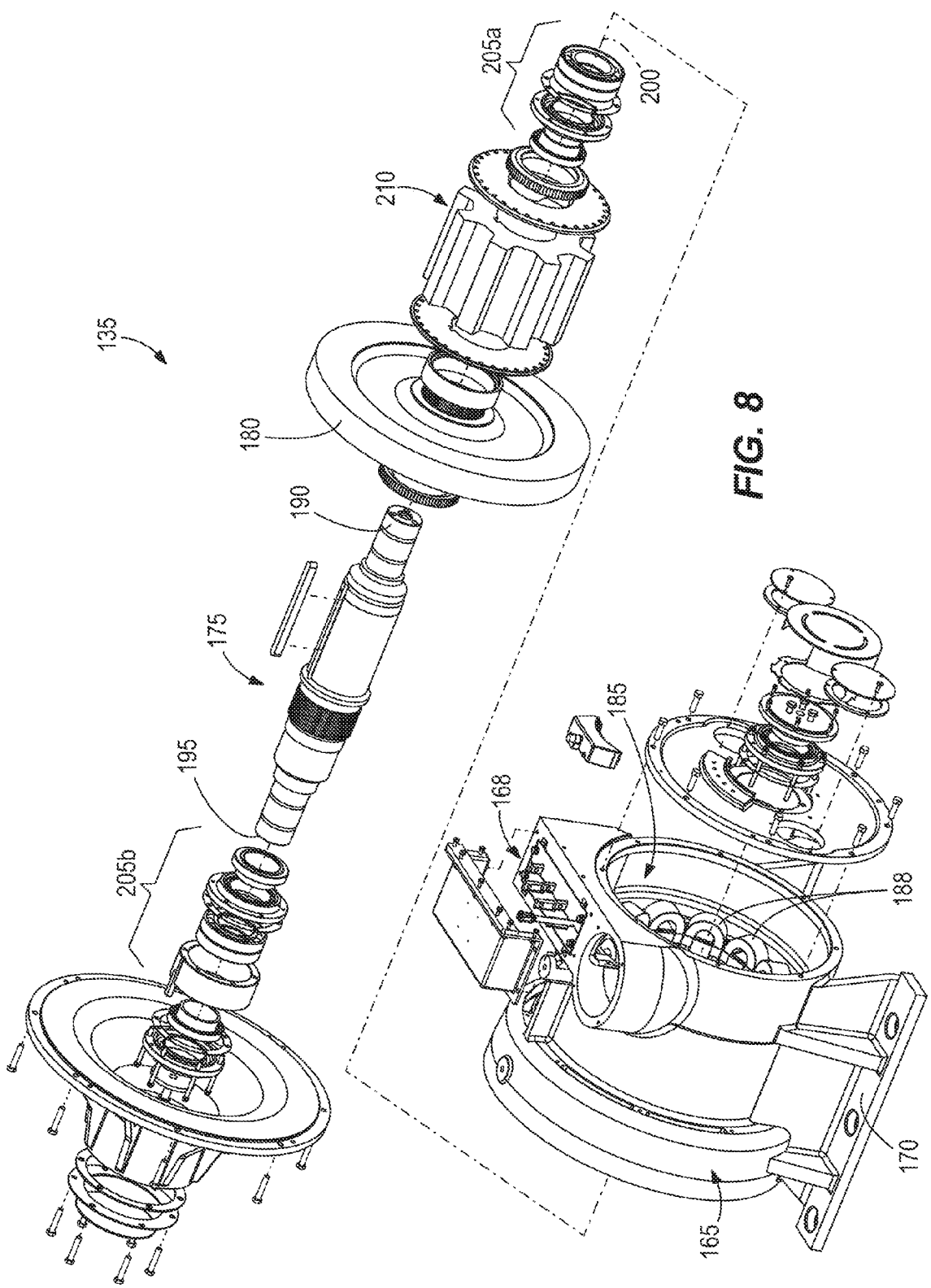
FIG. 8 is an exploded view of the energy storage system of FIG. 6.
Figure 9:
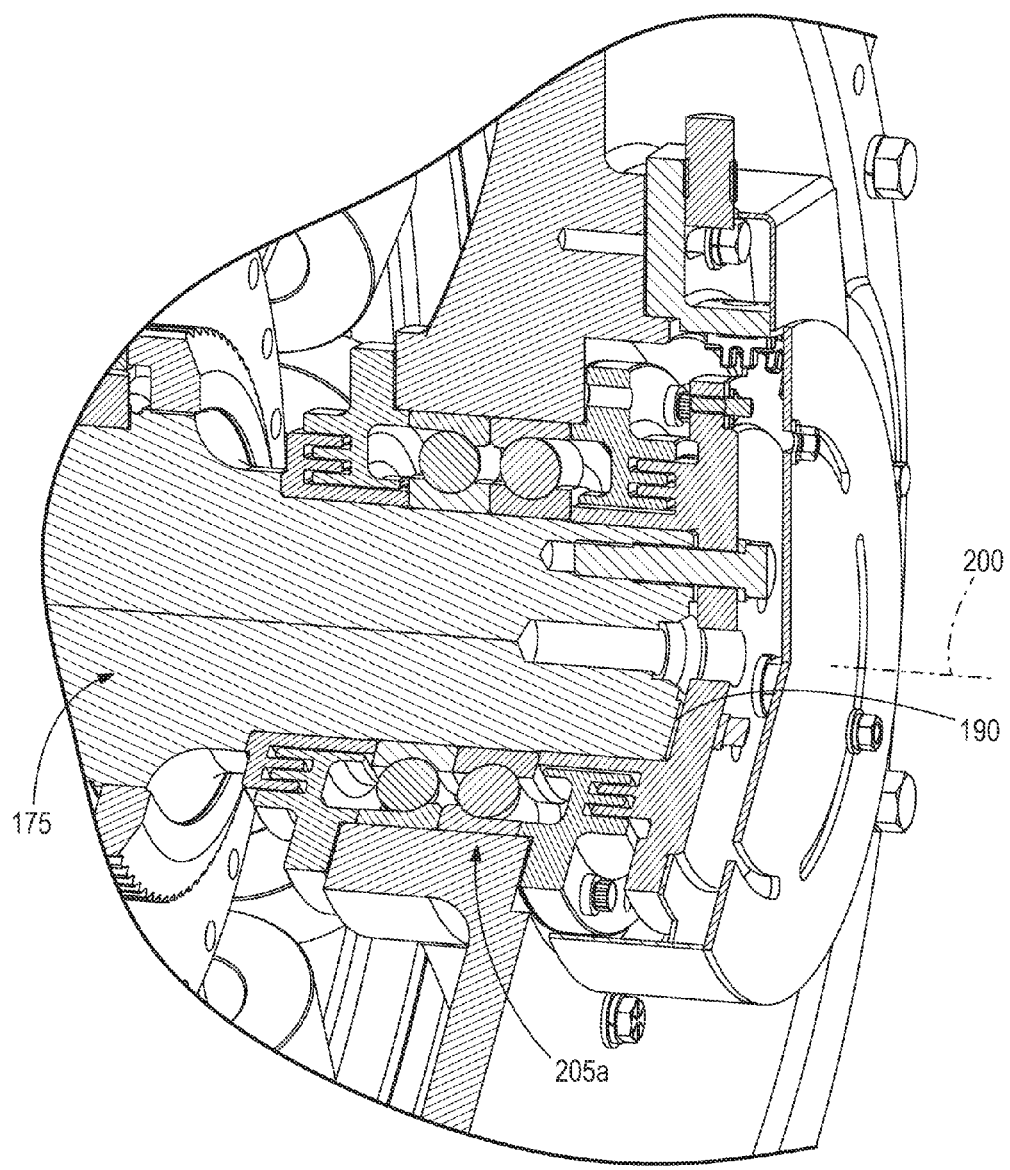
FIG. 9 is an enlarged view of section 9-9 of the side section view of FIG. 7.
Figure 10:
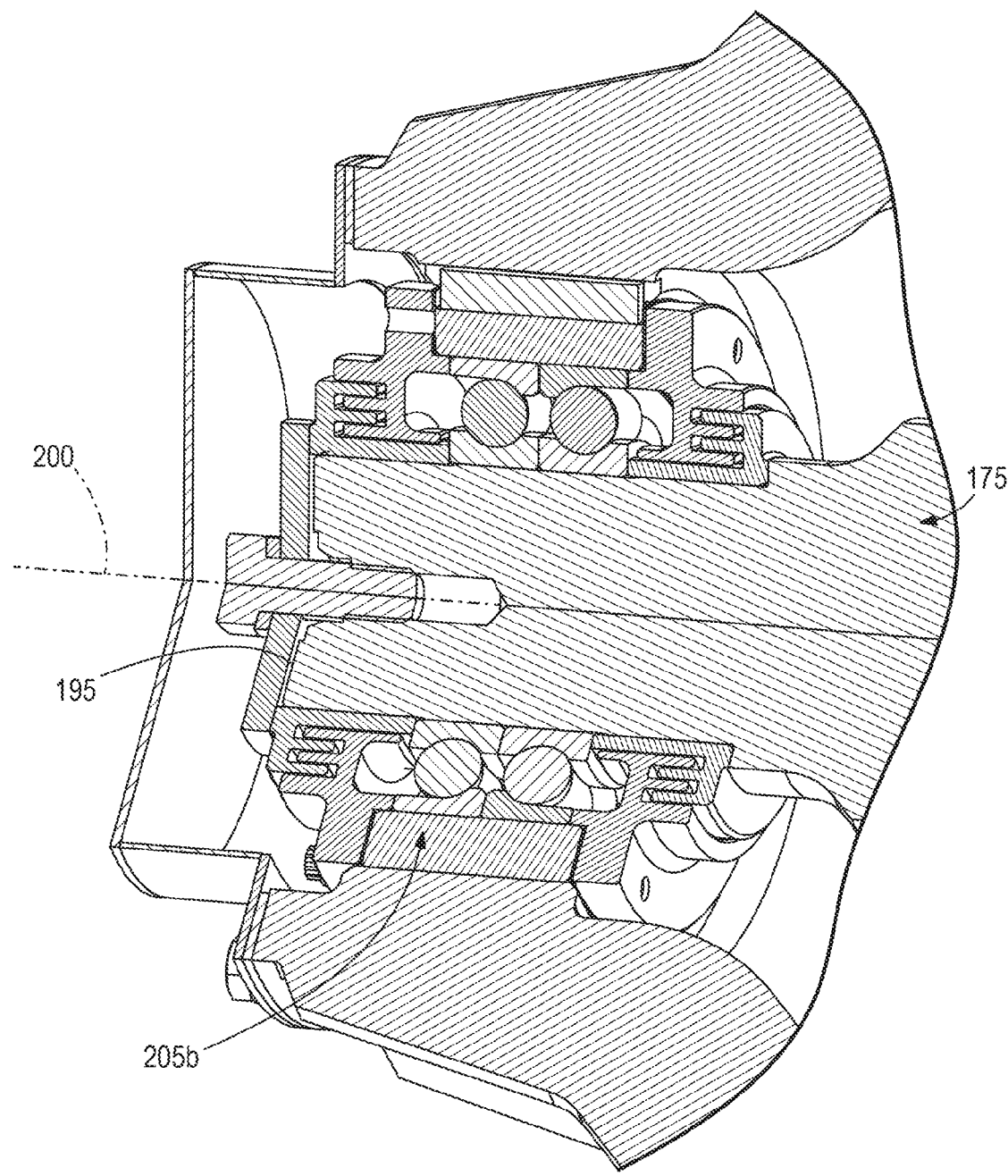
FIG. 10 is an enlarged view of section 10-10 of the side section view of FIG. 7.
Figure 11:
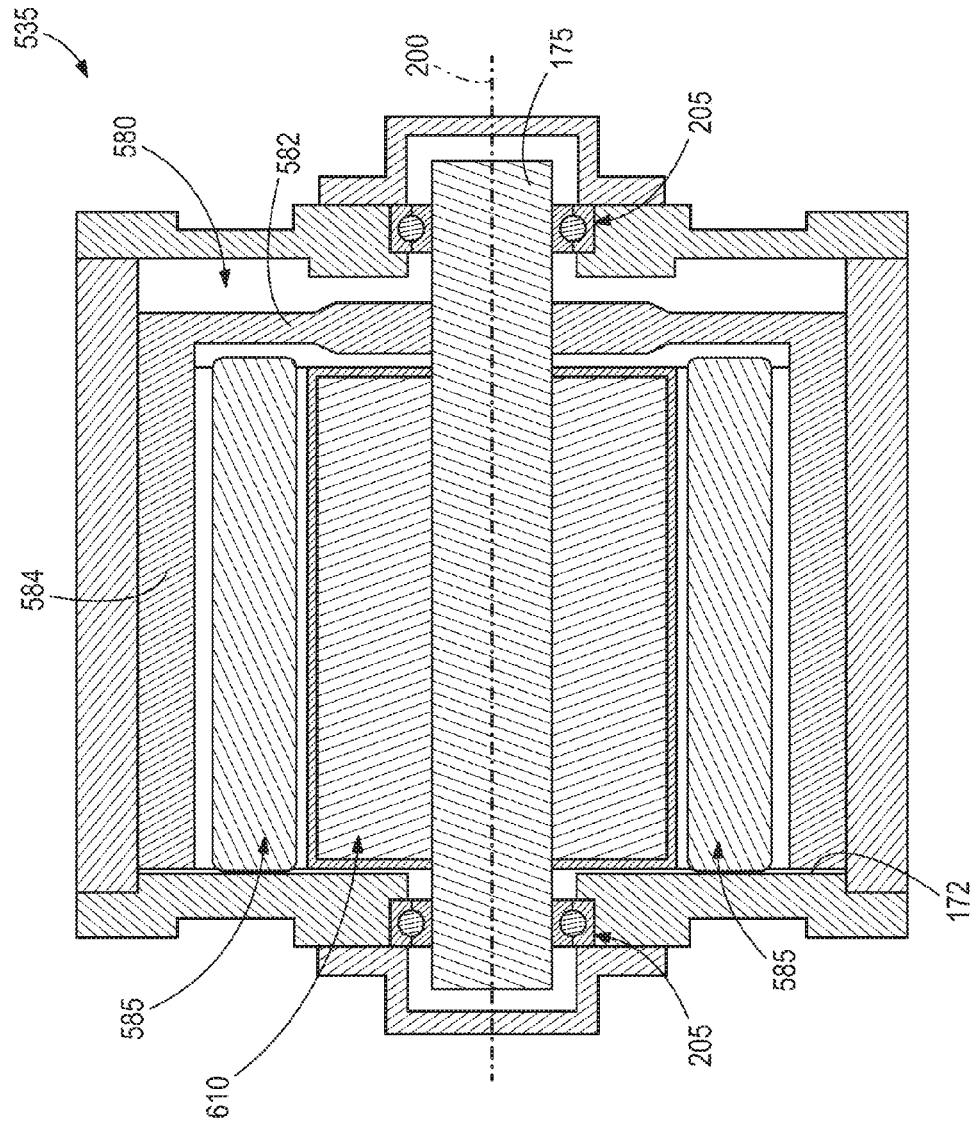
FIG. 11 is a side view of an energy storage device according to another embodiment.

Referring now to FIG. 6, the energy storage device 135 includes a housing 165 having feet 170 mounted on the chassis 102 (FIG. 1). The housing 165 also includes a junction box 168 in communication with the generator 102 (FIG. 4). As shown in FIGS. 7 and 8, the energy storage device 135 further includes a shaft 175, a flywheel 180 coupled to the shaft 175, and a motor stator 185 including coils 188. The shaft 175 extends through the housing 165 and includes a first end 190 and a second end 195. A shaft axis 200 extends between the first end 190 and the second end 195. Each end 190, 195 of the shaft 175 is supported for rotation relative to the housing 165 by bearings 205 (see also FIGS. 9 and 10). In the illustrated embodiment, the bearings 205 are double ball bearings. A lamination stack 210 forms a rotor and is secured to the outer surface of the shaft 175 proximate the first end 190. In the illustrated embodiment, the flywheel 180 is axially spaced apart from the rotor 210.

Referring to FIGS. 7 and 8, the motor stator 185 is secured within the housing 165 and extends around the lamination stack 210. The flywheel 180 is positioned within the housing 165. The flywheel 180 is secured to the shaft 175 proximate the second end 195, such that the flywheel 180 is spaced apart from the stator 185 along the axis 200. In the illustrated embodiment, the flywheel 180 is positioned between the bearings 205. That is, the second end 195 of the shaft 175 extends beyond the flywheel 180 and is supported for rotation by a bearing 205b. The rotation of the flywheel 180 and the operation of the machine induces a gyroscopic load on the bearings, and this load is related to the distance between the bearings and the gyroscopic load. Increasing the distance between the flywheel and the bearings reduces the resultant load on the bearings.

In conventional energy storage systems, larger energy storage capacity requires larger masses for the flywheel/storage component. Increasing the mass of the flywheel 180 increases the gyroscopic loads on the bearings. The configuration of the flywheel 180 with respect to the bearings 205 reduces the gyroscopic loads applied to the bearings 205 during operation. This allows a larger inertial mass, which in turn increases the energy storage capacity of the device 135. Increasing the energy storage capacity reduces the demand for engine power. In some embodiments, the increased storage capacity reduces the required engine output power by 50%.

The flywheel 180 stores kinetic energy in the form of rotational energy. The energy storage device 135 is configured to receive electrical energy and output rotational energy, as well as to receive rotational energy and output electrical energy. In some embodiments, the flywheel 180 is capable of rotating at speeds between approximately 0 revolutions per minute (rpm) and approximately 6,500 rpm. In some embodiments, the maximum rotational speed of the flywheel 180 is between approximately 3,000 rpm and approximately 10,000 rpm. In some embodiments, the maximum rotational speed of the flywheel 180 is between approximately 5,000 rpm and approximately 8,000 rpm. In some embodiments, the maximum rotational speed of the flywheel is approximately 6,500 rpm. Also, in some embodiments, the maximum energy storage and discharge capacity of the energy storage device 135 is between approximately 1 megajoule and approximately 15 megajoules. In some embodiments, the maximum energy storage and discharge capacity of the energy storage device 135 is between approximately 2 megajoules and approximately 7 megajoules. In some embodiments, the maximum energy storage and discharge capacity of the energy storage device 135 is approximately 3 megajoules.

In operation, the energy storage device 135 may receive electrical energy from, e.g., the generator 120. The electrical energy in the stator 185 induces the rotor shaft 175 to rotate about the shaft axis 200, thereby rotating the flywheel 180 and storing kinetic energy in the form of rotational energy in the flywheel 165. To discharge or extract the stored energy (i.e., to send electrical energy out of the energy storage device 135), the rotation of flywheel 180 is used to rotate the rotor shaft 175. Rotation of the rotor 175 in this manner acts as a generator to induce a current in the stator 185, thereby converting rotational energy into electrical energy. The electrical energy can be provided to other components of the mining machine 100, such as the motors 130. In some embodiments, when the energy storage device 135 is used in the mining machine 100, one of the converters 125 that would normally serve the generator 120 becomes the converter for the energy storage device 135.

FIG. 1 illustrates an energy storage device 535 according to another embodiment. A flywheel 580 is formed as a cylindrical member, such that the flywheel 580 includes a first or web portion 582 coupled to the shaft 175 and extending radially outwardly from the axis 200 of the shaft 175. The web portion 582 includes an outer periphery. The flywheel 580 further includes a cylindrical portion 584 extending from the periphery of web portion 582 along the axis 200 of the shaft 175. In the illustrated embodiment, the cylindrical portion 584 extends around the rotor lamination stack 610 and the stator 585, and the cylindrical portion 584 extends along the length of the rotor and stator assembly. In other embodiments, the cylindrical portion 584 may have a different length compared to the rotor and stator assembly. In some embodiments, the stator 585 is secured to an end wall 172 of the housing 165. This configuration increases the power density of the energy storage device per unit of mass.

Figure 13:
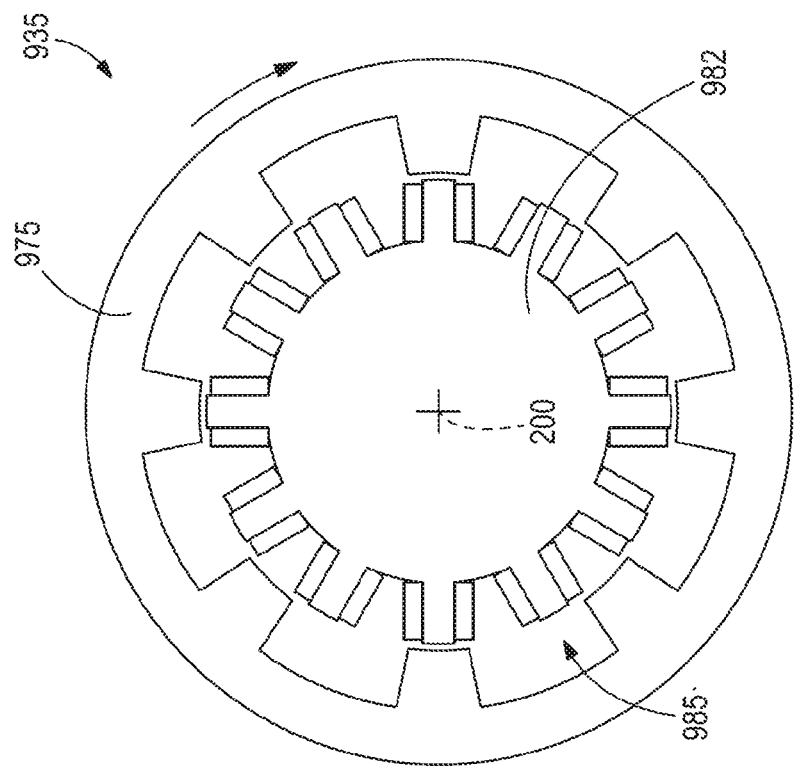
FIG. 13 is an end view of the energy storage device of FIG. 12.
Figure 12:
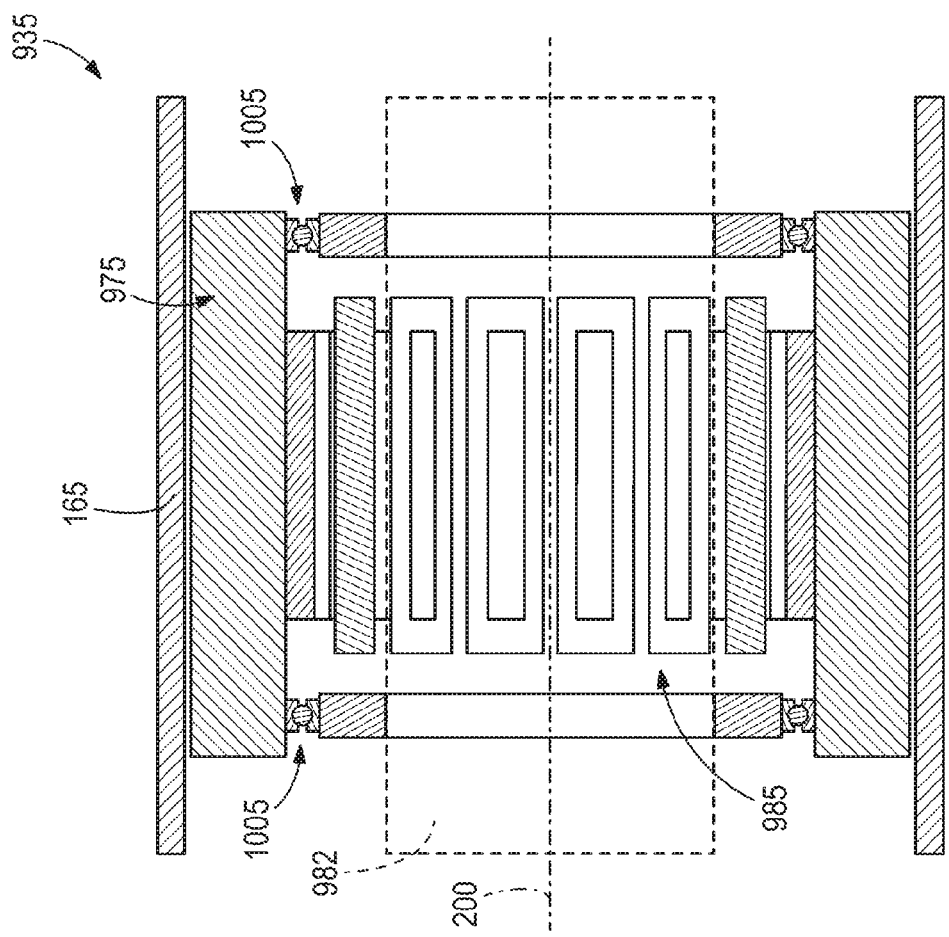
FIG. 12 is a side view of an energy storage device according to another embodiment.

FIGS. 12 and 13 illustrate an energy storage device 935 according to another embodiment. The rotor and flywheel are formed as a single assembly 975 rotating about a stationary stator core 985. The stator core 985 is positioned circumferentially within the rotor/flywheel assembly 975. The stator core 985 is supported on a shaft 982, and the rotor/flywheel assembly 975 is supported for rotation relative to the shaft 982 by bearings 1005. This configuration concentrates the inertial mass at an outer perimeter of the motor, thereby providing, among other things, more efficient energy storage per unit of mass and volume.

Although some aspects have been described in detail with reference to certain preferred embodiments, variations and modifications exist within the scope and spirit of one or more independent aspects as described.

What is claimed is:
1. A mobile mining machine comprising:
   a plurality of traction elements;
   a plurality of motors, each motor being coupled to an associated one of the plurality of traction elements, each motor configured to be driven by the associated traction element in a first mode, each motor configured to drive the associated traction element in a second mode;
a switched reluctance motor in electrical communication with the plurality of motors; and
an energy storage system in electrical communication with the plurality of motors and the power source, the energy storage system including a shaft defining a shaft axis, a rotor secured to the shaft, a stator extending around the rotor and around the shaft axis, and a flywheel coupled to the shaft for rotation therewith,
wherein, in the first mode, rotation of the plurality of motors causes rotation of the flywheel to store kinetic energy,
wherein, in the second mode, rotation of the rotor and the flywheel discharges kinetic energy to drive the plurality of motors.

2. The mobile mining machine of claim 1, further comprising
a bi-directional electrical bus providing electrical communication between the motors, the power source, and the energy storage system; and
a plurality of power converters, each power converter associated with one of the motors, the power source, and the energy storage system.

3. The mobile mining machine of claim 2, wherein in the first mode the rotation of the motors transmits electrical energy to the energy storage system via the bus, the electrical energy causing rotation of the flywheel, wherein in the second mode rotation of the rotor and the flywheel is converted to electrical energy and transmitted to the motors via the bus.

4. The mobile mining machine of claim 1, further comprising a plurality of braking mechanisms, each of the braking mechanisms associated with one of the motors, wherein when the speed of the motor is reduced, the motor supplies energy to the energy storage system.

5. The mobile mining machine of claim 4, wherein, in the first mode, when the energy storage system reaches a maximum storage capacity, additional energy created by the rotation of the plurality of motors is transmitted to one of the braking mechanisms and dissipated as heat.

6. The mobile mining machine of claim 1, wherein the switched reluctance motor is coupled to one of more hydraulic pumps for driving auxiliary actuators.

7. The mobile mining machine of claim 1, wherein, in the first mode, the switched reluctance motor may receive energy from the plurality of motors, the switched reluctance motor driving an engine at a constant speed to reduce fuel consumption.

8. The mobile mining machine of claim 1, wherein the flywheel may rotate at least 3000 revolutions per minute, and wherein the energy storage system outputs energy of at least approximately 1 megajoule.

9. The mobile mining machine of claim 1, wherein the flywheel includes a first portion and a second portion, the first portion extending radially outward from the shaft and defining a periphery spaced apart from the shaft, the second portion connected to the periphery and extending axially along a portion of the shaft.

10. The mobile mining machine of claim 9, wherein the second portion extends around the rotor and the stator.

11. A mobile haulage vehicle comprising:
a chassis;
a boom including a first end pivotably coupled to the chassis and a second end;
an attachment coupled to the second end of the boom; and
a drive system including,
a bi-directional electrical bus;
a plurality of traction elements supporting the chassis;
a plurality of motors, each motor being coupled to an associated one of the plurality of traction elements and in electrical communication with the bus, each motor configured to be driven by the associated traction element in a first mode, each motor configured to drive the associated traction element in a second mode;
a switched reluctance motor in electrical communication with the plurality of motors via the bus; and
an energy storage system in electrical communication with the plurality of motors and the switched reluctance motor via the bus, the energy storage system including a housing secured to the chassis, a shaft, a rotor secured to the shaft, a stator, and a flywheel coupled to the shaft for rotation therewith, the shaft defining a shaft axis and supported for rotation relative to the housing, the stator extending around the rotor and around the shaft axis,
wherein, in the first mode, rotation of the plurality of motors transmits electrical energy to the energy storage system via the bus, the electrical energy driving rotation of the flywheel to store kinetic energy,
wherein, in the second mode, rotation of the rotor and the flywheel transmits electrical energy to the motors via the bus, driving the plurality of motors.

12. The mobile haulage vehicle of claim 11, further comprising a plurality of power converters, each power converter providing electrical communication between the bus and one of the energy storage system, the switched reluctance motor, and one of the motors.

13. The mobile haulage vehicle of claim 11, further comprising a plurality of braking mechanisms, each of the braking mechanisms associated with one of the motors, wherein when the speed of the motor is reduced, the motor supplies energy to the energy storage system.

14. The mobile haulage vehicle of claim 11, wherein, in the first mode, when the energy storage system reaches a maximum storage capacity, additional energy created by the rotation of the plurality of motors is transmitted to one of the braking mechanisms and dissipated as heat.

15. The mobile haulage vehicle of claim 11, wherein the drive system further includes an engine coupled to the switched reluctance motor.

16. The mobile haulage vehicle of claim 11, wherein the switched reluctance motor is coupled to at least one hydraulic pump for driving at least one auxiliary actuator.

17. The mobile haulage vehicle of claim 11, wherein, in the first mode, the switched reluctance motor may receive energy from the plurality of motors, the switched reluctance motor driving an engine at a constant speed to reduce fuel consumption.

18. The mobile haulage vehicle of claim 11, wherein the flywheel may rotate between approximately 0 revolutions per minute and approximately 6500 revolutions per minute, and wherein the energy storage system outputs energy of up to approximately 3 megajoules.

19. A drive system for a haulage vehicle, the drive system comprising:
a bi-directional electrical bus;
a plurality of wheels;
a plurality of motors, each motor being coupled to an associated one of the plurality of wheels and in electrical communication with the bus, each motor configured to be driven by the associated wheel in a first mode, each motor configured to drive the associated wheel in a second mode;

a plurality of power converters, each power converter providing electrical communication between the bus and one of the motors;

a switched reluctance motor in electrical communication with the plurality of motors via the bus, the switched reluctance motor coupled to at least one hydraulic pump for driving at least one auxiliary actuator;

an engine coupled to the switched reluctance motor; and an energy storage system in electrical communication with the plurality of motors and the switched reluctance motor via the bus, the energy storage system including a housing, a shaft defining a shaft axis and supported for rotation relative to the housing, a rotor secured to the shaft, a stator, and a flywheel coupled to the shaft for rotation about the shaft axis, the stator extending around the rotor and around the shaft axis.

20. The drive system of claim 19, wherein in a first mode the rotation of the motors transmits electrical energy to the energy storage system and causes rotation of the flywheel, wherein in a second mode rotation of the rotor and the flywheel discharges energy to drive the plurality of motors.

21. The drive system of claim 19, further comprising a plurality of braking mechanisms, each of the braking mechanisms associated with one of the motors, wherein when the speed of one of the motors is reduced, the one motor supplies energy to the energy storage system.

22. The drive system of claim 19, wherein, in at least one mode of operation, the switched reluctance motor may receive energy from the plurality of motors, the switched reluctance motor driving the engine at a constant speed to reduce fuel consumption.

* * * * *